US012485300B2

(12) United States Patent
Hajianpour

(10) Patent No.: US 12,485,300 B2
(45) Date of Patent: Dec. 2, 2025

(54) SINGLE-USE, DISPOSABLE HELMETS, HOODS, AND HELMET/HOOD ASSEMBLIES, AND METHODS OF MAKING AND USING THE SAME

(71) Applicant: Zoya, Inc., Ft. Lauderdale, FL (US)

(72) Inventor: Mohammed Ali Hajianpour, Lauderdale Lakes, FL (US)

(73) Assignee: Zoya, Inc., Ft. Lauderdale, FL (US)

( * ) Notice: Subject to any disclaimer, the term of this patent is extended or adjusted under 35 U.S.C. 154(b) by 999 days.

(21) Appl. No.: 17/496,407

(22) Filed: Oct. 7, 2021

(65) Prior Publication Data

US 2022/0184431 A1 Jun. 16, 2022

Related U.S. Application Data

(63) Continuation-in-part of application No. 17/246,753, filed on May 3, 2021, now abandoned.
(Continued)

(51) Int. Cl.
*A62B 18/04* (2006.01)
*A41D 13/11* (2006.01)
(Continued)

(52) U.S. Cl.
CPC ........ *A62B 18/045* (2013.01); *A41D 13/1153* (2013.01); *A62B 17/04* (2013.01); *A62B 18/084* (2013.01)

(58) Field of Classification Search
CPC ............ A41D 13/1218; A41D 13/1153; A41D 13/1184; A62B 9/04; A62B 18/10;
(Continued)

(56) References Cited

U.S. PATENT DOCUMENTS 3,685,054 A 8/1972 Raschke
3,991,422 A 11/1976 Saotome
(Continued)

FOREIGN PATENT DOCUMENTS

CN 109068784 A 12/2018
EP 1925222 A2 5/2008
(Continued)

OTHER PUBLICATIONS

"ISO 3744:2010—Acoustics", https://www.iso.org/standard/52055.html, Accessed on Feb. 2025 (Year: 2010).
(Continued)

*Primary Examiner* — Kendra D Carter
*Assistant Examiner* — Jaeick Jang
(74) *Attorney, Agent, or Firm* — Michael J Porco

(57) ABSTRACT

Hood assemblies with disposable hoods are provided. In one implementation, a single-use, disposable hood includes a hood material sized to extend over a user's head and down to a neck/shoulder region of the user. The hood material includes a face shield opening extending through the hood material, a lower edge extending along a lower periphery of the hood material, and an air inlet hole through the hood material. The hood further includes an air inlet structure surrounding the air inlet hole, the air inlet structure having a base structure shaped as a truncated cone and a base aperture substantially aligned with the air inlet hole. The air inlet structure further includes an extension structure extending outward from the base structure, the extension structure having multiple vertical extensions arranged substantially perpendicular to the base structure and a ring structure attached to opposite ends of the vertical extensions from the base structure.

19 Claims, 20 Drawing Sheets

Related U.S. Application Data

(60) Provisional application No. 63/185,199, filed on May 6, 2021, provisional application No. 63/126,138, filed on Dec. 16, 2020.

(51) Int. Cl.
*A62B 17/04* (2006.01)
*A62B 18/08* (2006.01)

(58) Field of Classification Search
CPC .... A62B 3/12; A62B 3/14; A62B 3/28; A62B 3/281; A62B 3/283; A62B 3/285; A62B 3/286; A62B 3/288; A61M 16/0627
See application file for complete search history.

(56) References Cited

U.S. PATENT DOCUMENTS 5,604,935 A 2/1997 Nezer
5,628,071 A 5/1997 Nezer
5,671,483 A * 9/1997 Reuber .................. A42B 3/245 2/435
6,374,823 B1 4/2002 Hajianpour
6,536,045 B1 * 3/2003 Wilson ..................... G02B 1/11 2/424
7,264,368 B2 9/2007 Sherring
7,357,135 B2 4/2008 Cunningham et al.
7,937,775 B2 5/2011 Manzella, Jr. et al.
8,020,552 B2 9/2011 Dillon et al.
9,980,529 B1 5/2018 Hajianpour
2001/0032348 A1 10/2001 Diaz et al.
2007/0028372 A1 2/2007 VanDerWoude et al.
2007/0089221 A1 4/2007 Manzella et al.
2008/0202509 A1 8/2008 Dillon et al.
2014/0039273 A1 2/2014 Kim et al.
2015/0151070 A1 6/2015 Capra et al.
2015/0327617 A1 11/2015 Gaudillere
2015/0375019 A1 12/2015 VanDerWoude et al.
2016/0193485 A1 * 7/2016 Izz .......................... A62B 17/04 128/201.28
2019/0091435 A1 3/2019 Steed et al.
2020/0060375 A1 2/2020 Jascomb et al.
2020/0178622 A1 * 6/2020 Jascomb ................. B32B 27/08
2021/0308499 A1 10/2021 Gomes et al.

FOREIGN PATENT DOCUMENTS

EP 2117367 A1 11/2009
KR 20140062972 A * 5/2014 ............. A62B 17/04
KR 20220170603 A * 12/2022 ......... A41D 13/1218
WO WO-2008106135 A1 * 9/2008 ......... A41D 13/1153
WO WO-2014029511 A2 * 2/2014 ........... A62B 17/001
WO 2014160149 A2 10/2014
WO WO-2022248341 A1 * 12/2022 ............. A62B 17/04

OTHER PUBLICATIONS

Machine translation of CN-109068784-A (Year:2018).

* cited by examiner

SINGLE-USE, DISPOSABLE HELMETS, HOODS, AND HELMET/HOOD ASSEMBLIES, AND METHODS OF MAKING AND USING THE SAME

RELATED APPLICATIONS

This patent application claims the benefit of priority to (i) U.S. Provisional Patent Application Ser. No. 63/126,138 filed on Dec. 16, 2020 and entitled "SINGLE-USE, DISPOSABLE HELMETS, HOODS, AND HELMET/HOOD ASSEMBLIES, AND METHODS OF MAKING AND USING THE SAME," (ii) U.S. Provisional Patent Application Ser. No. 63/185,199 filed on May 6, 2021 and entitled "SINGLE-USE, DISPOSABLE HELMETS, HOODS, AND HELMET/HOOD ASSEMBLIES, AND METHODS OF MAKING AND USING THE SAME," and (iii) U.S. Utility patent application Ser. No. 17/246,753 filed on Jul. 5, 2021 and entitled "SINGLE-USE, DISPOSABLE HELMETS, HOODS, AND HELMET/HOOD ASSEMBLIES, AND METHODS OF MAKING AND USING THE SAME," the subject matter of each of which is hereby incorporated by reference in its entirety.

FEDERALLY SPONSORED RESEARCH OR DEVELOPMENT

Not applicable

FIELD OF THE INVENTION

The present invention relates to helmets, hoods, and helmet/face shield/hood assemblies to be worn as personal protective equipment (PPE) by first responders and/or surgical personnel, viral pandemic first responders, and anyone needing protection from bacterial or viral ambient environments, and, more particularly, to such helmets, hoods, and helmet/face shield/hood assemblies having a structure and assembly configured to include a fan to eliminate hood visor moisture, and provide complete protection from ambient bacteria and viruses.

BACKGROUND OF THE INVENTION

In recent years it has become apparent that a helmet/hood was needed to protect operating room personnel while patients undergoing surgical procedures from contamination by one another. A system was needed to provide separate air spaces in which each of the operating room personnel would breathe and in which the surgical procedure would occur, so that the surgical site would not be contaminated by airborne contaminates exhaled or otherwise expelled by the operating room personnel, and additionally so that operating room personnel will not be contaminated by blood spatter and other airborne contamination from the surgical site.

Viruses that cause human illnesses and deaths have begun surfacing throughout the world, resulting in pandemics such as being experienced now by Covid 19. Because of the widespread Covid 19 virus throughout the United States and other countries of the world, to avoid widespread contamination of the disease among groups of people, it has become necessary that several different occupations, associated with protecting against the virus, require that individuals performing medical and protection services must wear personal protective equipment (PPE) including helmet/face shield/hood assemblies to prevent viral contamination of the individual.

Especially among medical personnel such as doctors and nurses, who are on the first line of the virus defense and treating Covid 19 patients and/or similar contagious illnesses, it is absolutely essential that each doctor and nurse and anyone else working in the hospital or medical clinic have PPE, especially in the form of a helmet/hood. Often these people are referred to as first responders who are the first people to come in personal contact with a sick individual that has been exposed to the Covid 19 virus or other virulent organisms. It is absolutely crucial that the first responder personnel have extremely excellent personal protective equipment in the form of a hood/helmet that prevents contamination to the person by the virus, bacteria, or any other virulent contagious organisms.

In addition, during surgical procedures, the face shield of a hood assembly may become contaminated with fluids (e.g., blood, etc.), and require removal of the contaminating fluid so that the medical personnel wearing the face shield can see through the face shield. Methods to address this type of contamination during surgery need to be addressed.

Efforts continue to further develop effective personal protective equipment (PPE).

SUMMARY OF THE INVENTION

The present invention is directed to helmets, hoods, and helmet/hood assemblies that provide a number of advantages over known helmets, hoods, and helmet/hood assemblies. The disclosed helmets, hoods, and helmet/hood assemblies are single-use, disposable helmets, hoods, and helmet/hood assemblies that can be fully assembled and packaged so as to occupy a minimal amount of helmet, hood, and helmet/hood assembly volume. In addition, the disclosed helmets, hoods, and helmet/hood assemblies comprise one or more features that enable easy use, convenience, and superior protection against contamination by viruses, bacteria, or any other virulent contagious organisms.

In one embodiment, the single-use, disposable helmet of the present invention comprises: a main frame comprising a forehead strap and an anterior shield strap with a fan platform positioned between the forehead strap and the anterior shield strap; and a fan positioned within the fan platform; wherein the helmet is collapsible into a volume having a length of up to about 16.0 inches, a width of up to about 20.0 inches, and a height of up to about 3.5 inches when fully assembled. In some embodiments, the single-use, disposable helmet is collapsible into a volume having a length of up to 14.0 inches, a width of up to about 18.5 inches, and a height of up to about 2.5 inches when fully assembled. In yet other embodiments, the single-use, disposable helmet is collapsible into a volume having a length of up to 12.0 inches, a width of up to about 17.0 inches, and a height of up to about 1.5 inches when fully assembled. When expanded from its collapsible state (i.e., shipping and/or storage state) into a "use" or operational state, the single-use, disposable helmets of the present invention expand for the above-mentioned volumes into a single-use, disposable helmet having outer dimensions of: a length of about 11.0 inches, a width of about 11.0 inches, and a height of about 10.0 inches when fully expanded.

The single-use, disposable helmet of the present invention may further comprise a backward slope that causes an attached face shield to extend downward and towards a user's face. In this embodiment, the single-use, disposable helmet comprises: a main frame comprising a forehead strap and an anterior shield strap with a fan platform positioned between the forehead strap and the anterior shield strap; a fan positioned within the fan platform; wherein the anterior shield strap has an upper front edge, a lower front edge, and a backward slope extending between the upper front edge and the lower front edge. The backward slope may comprise a slope angle A of greater than 0° up to about 30°. In some desired embodiments, the backward slope comprises a slope angle A of about 15° or about 20°.

The single-use, disposable helmet of the present invention may further comprise a fan guard. In this embodiment, the single-use, disposable helmet comprises: a main frame comprising a forehead strap and an anterior shield strap with a fan platform positioned between the forehead strap and the anterior shield strap; a fan positioned within the fan platform; and a fan guard that is sized to extend over the fan platform and the fan, the fan guard preventing a hood from coming into contact with the fan.

In yet other embodiments, the single-use, disposable helmet comprises: a main frame comprising a forehead strap and an anterior shield strap with a fan platform positioned between the forehead strap and the anterior shield strap; a fan positioned within the fan platform; and a collapsible air channel that is sized to extend over the fan platform and the fan, the collapsible air channel preventing a hood from coming into contact with the fan, wherein the collapsible air channel is movable from a collapsed state (i.e., for shipping and storage) to an operational state (i.e., in use).

In some embodiments, the single-use, disposable helmet comprises: a main frame comprising a forehead strap and an anterior shield strap with a fan platform positioned between the forehead strap and the anterior shield strap; a fan positioned within the fan platform; an air channel that is sized to extend (i) from over the fan platform and the fan to (ii) a position over a user's head; and one or more UVC lights positioned along the air channel, wherein the one or more UVC lights provide UVC light having a wavelength of from about 230 nanometers (nm) to about 275 nm.

The present invention is further directed to hoods, and face shield/hood assemblies that provide a number of advantages over known hoods, and face shield/hood assemblies. The disclosed hoods, and face shield/hood assemblies are single-use, disposable hoods, and face shield/hood assemblies that enable easy use, convenience, and superior protection against contamination by viruses, bacteria, or any other virulent contagious organisms. The disclosed hoods, and face shield/hood assemblies can be used, in combination, with known helmets, as well as any of the single-use, disposable helmets of the present invention described herein.

In some embodiments, the hood of the present invention is suitable for use with any of the herein-described helmets and helmet/hood assemblies of the present invention. In some embodiments, the hood comprises hood material sized to extend over a user's head and down to a neck/shoulder region of the user, the hood material comprising: (i) a face shield opening extending through the hood material and along a front side of the hood, and (ii) a lower edge extending along a lower periphery of the hood material and around a hood opening of the hood; and a tie-string positioned proximate the lower edge and extending along at least a portion of the lower periphery of the hood material, the tie-string enabling a user to reduce a circumference of the hood opening from an initial circumference to an in-use circumference.

In some embodiments, the single-use, disposable hood of the present invention comprises (a) hood material sized to extend over a user's head and down to a neck/shoulder region of the user, the hood material comprising: (i) a face shield opening extending through the hood material and along a front side of the hood, and (ii) a lower edge extending along a lower periphery of the hood material and around a hood opening of the hood; (b) a fixed face shield attached to and covering the face shield opening; (c) two or more hood connecting members (e.g., VELCRO® hook and loop components, magnets, adhesive components, etc.) positioned along an outer periphery of the face shield opening; and (d) at least one removable stick-on face shield guard sized to extend over the face shield opening and be removably attachable to the hood, each of said at least one removable stick-on face shield guard comprises (i) a transparent face shield material, and (ii) two or more face shield guard connecting components (e.g., VELCRO® hook and loop components, magnets, adhesive components, etc.), the two or more face shield guard connecting components being connectable to (i.e., engageable with) the two or more hood connecting members. In some embodiments, each of the two or more hood connecting members comprises a hook or loop material (e.g., a hook or loop VELCRO® material), and each of the two or more face shield guard connecting components comprises a loop or hook material (e.g., a corresponding loop or hook VELCRO® material).

The present invention is even further directed to a package containing any of the herein-described helmets, hoods, helmet/hood assemblies, and face shield/hood assemblies of the present invention. In some embodiments, the package comprises (i) the helmet, hood, helmet/hood assembly, and/or face shield/hood assembly of the present invention in a shipping configuration, and (ii) packaging material surrounding the helmet, hood, helmet/hood assembly, and/or face shield/hood assembly, wherein the package has a package volume with a package length of up to about 16.0 inches, a package width of up to about 20.0 inches, and a package height of up to about 3.5 inches. In some embodiments, the package has a package length of up to 14.0 inches, a package width of up to about 18.5 inches, and a package height of up to about 2.5 inches. In other embodiments, the package has a package length of up to 12.0 inches, a package width of up to about 17.0 inches, and a package height of up to about 1.5 inches.

The present invention is even further directed to methods of making any of the herein-described helmets, hoods, helmet/hood assemblies, and face shield/hood assemblies of the present invention. In some embodiments, the method of making the helmet comprises the steps of: combining the forehead strap, the anterior shield strap, and the fan platform; and positioning the fan within the fan platform. In other embodiments, the method of making the hood comprises the steps of attaching a fixed face shield to a hood material so as to cover a face shield opening within the hood material; incorporating two or more hood connecting members along an outer periphery of the face shield opening; and forming a removable stick on face shield guard that comprises (i) a transparent face shield material, and (ii) two or more face shield guard connecting components, the two or more face shield guard connecting components being connectable/attachable to the two or more hood connecting members.

The present invention is even further directed to methods of using any of the herein-described helmets, hoods, helmet/hood assemblies, and face shield/hood assemblies of the present invention. In some embodiments, the method of using the helmet, hood, helmet/hood assembly, and/or face shield/hood assembly comprises the steps of: positioning the helmet, hood, and/or helmet/hood assembly on a user's head. In other embodiments, the method of using the hood comprises the steps of positioning the hood, and/or face shield/hood assembly on a user's head.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

Figure 1:
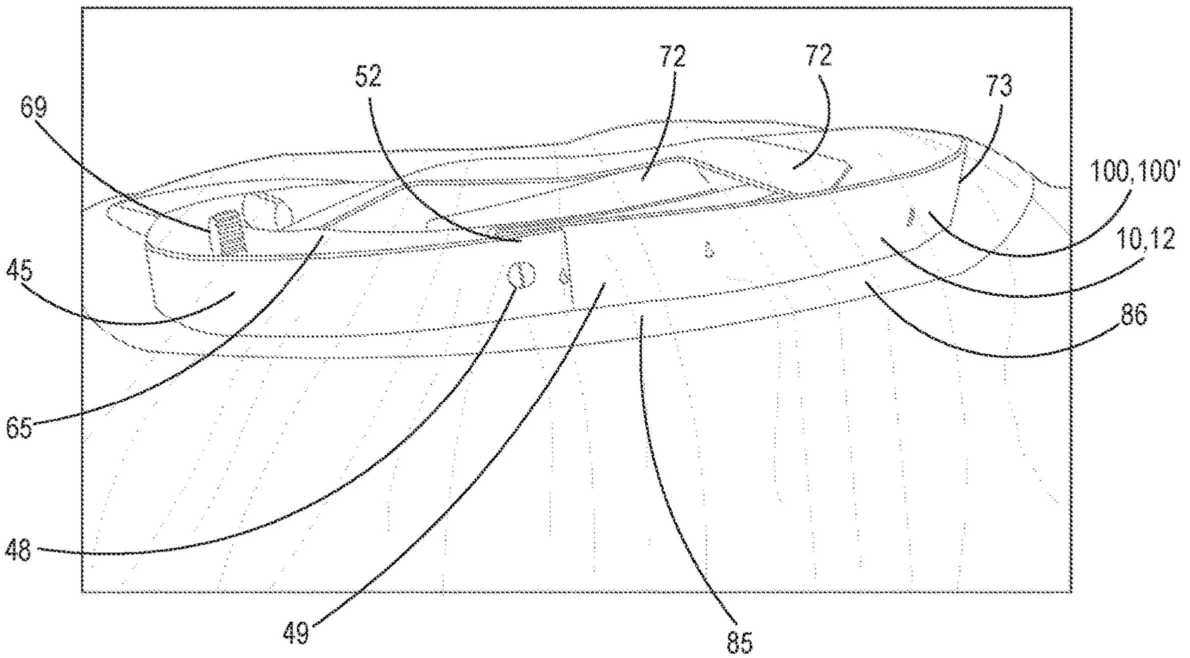
FIG. 1 depicts a perspective view of an exemplary helmet of the present invention in a shipping/storage configuration.

The helmets, hoods, helmet/hood assemblies, face shield/hood assemblies, and helmet/face shield/hood assemblies of the present invention are extremely useful as personal protective equipment (PPE) in protecting people such as first providers protection from bacteria and viruses, such as the Covid 19 virus, by preventing the virus from contacting the skin of the wearer of the protective equipment or breathing the contaminated environmental air.

The hoods, helmet/hood assemblies, and helmet/face shield/hood assemblies of the present invention comprise a hood in the form of a sheet of suitable viral and bacterial protective material (i.e., referred to herein as "the hood material") that can encompass the head and shoulders of a user. The hood protective material is desirably moisture proof and blood proof. The hood protective material may be attached to and surround a face shield of any of the herein-described helmets (i.e., referred to herein in some embodiments as "the fixed face shield") forming a large hood/cover over the user's head. The helmets, helmet/hood assemblies, and helmet/face shield/hood assemblies of the present invention may comprise a translucent frame (also referred to herein as a "loop" formed by the main frame and first and second gear straps) that has an area slightly larger than the human head. A polycarbonate or any flexible sheet clear visor may be glued (or otherwise attached) to the hood protective material to form a "fixed face shield" of the face shield/hood assembly or helmet/hood/face shield assembly. The frame is thin enough to allow it to be bent and shaped around the head of the wearer.

The helmets, helmet/hood assemblies, and helmet/face shield/hood assemblies of the present invention further comprise a fan that is mounted on the front of the main frame to provide airflow to the back space of the visor/face shield glued to the hood protective material and attached to the main frame by means of hook and loop type material (e.g., VELCRO® material) or other connectors such as one or more magnets. The hood protective material may have a rectangular cutout portion so that edges surrounding the rectangular cutout portion can be glued (or otherwise connected) to the hood protective material surrounding the translucent shield, protecting the user but allowing the user to look through the visor/face shield without interference of the hood protective material.

The helmets, helmet/hood assemblies, and helmet/face shield/hood assemblies of the present invention may further comprise a number of additional features. A small battery pack may be connected to the fan with a standard connector. A flexible fan guard may be provided and configured above the fan to prevent the hood protective material from coming into contact with the fan. Alternatively, a collapsible air channel may be provided and configured above the fan to prevent the hood protective material from coming into contact with the fan. In addition, a HEPA filter may be attached above the fan to provide further protection.

In order to attach the helmets and helmet/face shield/hood assemblies of the present invention to a human head, a foam strip may be applied to the frame along with a flexible adjustable head engaging strap connected to a gear—on the back of the head with a knob to adjust the length of the flexible band around the head. The helmets and helmet/face shield/hood assemblies can be comfortably positioned on the user's head, allowing the user to look through the clear visor/face shield while being completely inside the impenetrable hood protective material extending over the user's head and shoulders. The fan may be turned on to prevent fogging of the face shield by blowing air (e.g., from an air channel above the fan) in front of the user's face.

In some embodiments, the impenetrable hood protective material sheet is sized to fit over the top of the user's head, the back of the head, the neck, and shoulders and under the chin of the user, and can be tucked into a protective gown or jumpsuit worn by the user. In some embodiments, the hoods, and face shield/hood assemblies further comprise a tie-string positioned proximate a lower edge and extending along at least a portion of a lower periphery of the hood material, the tie-string enabling a user to reduce a circumference of a hood opening of the hood from an initial circumference to an in-use circumference. In addition, in some embodiments, the hoods, and face shield/hood assemblies further comprise a fixed face shield attached to the hood material and covering the face shield opening; two or more hood connecting members positioned along an outer periphery of the face shield opening; and at least one removable stick-on face shield guard sized to extend over the face shield opening and be removably attachable to the hood, each of the removable stick-on face shield guards comprising (i) a transparent face shield material, and (ii) two or more face shield guard connecting components, the two or more face shield guard connecting components being attachable/connectable/engageable with the two or more hood connecting members.

First responders or any other person with any danger of being in an environment with virulent agents, such as bacteria/virus, Covid 19 virus, etc. will be fully protected with the gown or jumpsuit and the helmets, hoods, face shield/hood assemblies, and helmet/face shield/hood assemblies of the present invention even if performing medical surgery and be completely isolated from the outside environment without any fogging of the visor/face shield.

The present invention will be further described in the following additional embodiments, examples, and claims.

Additional Embodiments

Helmet and Helmet/Face Shield/Hood Combinations

1. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; wherein the helmet 100 is collapsible into a volume having a length of up to about 16.0 inches, a width of up to about 20.0 inches, and a height of up to about 3.5 inches when fully assembled.

2. The helmet 100 of embodiment 1, wherein the helmet 100 is collapsible into a volume having a length of up to 14.0 inches, a width of up to about 18.5 inches, and a height of up to about 2.5 inches when fully assembled.

3. The helmet 100 of embodiment 1 or 2, wherein the helmet 100 is collapsible into a volume having a length of up to 12.0 inches, a width of up to about 17.0 inches, and a height of up to about 1.5 inches when fully assembled.

4. The helmet 100 of any one of embodiments 1 to 3, wherein the anterior shield strap 12 has an upper front edge 15, a lower front edge 16, and a backward slope 17 extending between the upper front edge 15 and the lower front edge 16.

Figure 9:
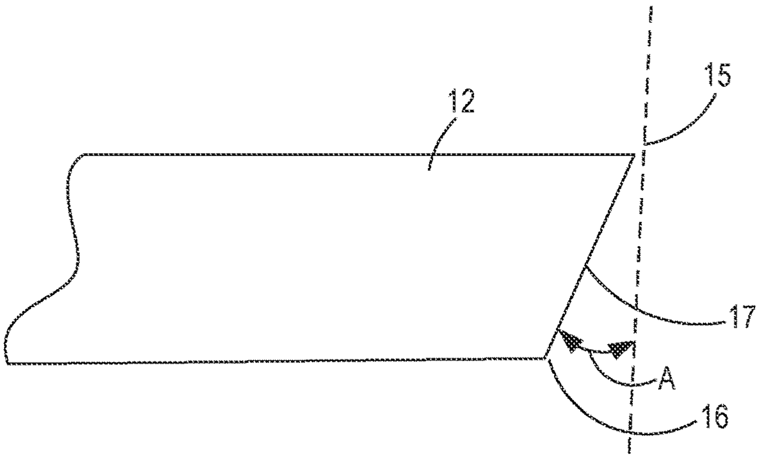
FIG. 9 depicts a schematic view of the backward slope of the exemplary main frame of the exemplary helmet shown in FIG. 2B.

5. The helmet 100 of embodiment 4, wherein the backward slope 17 comprises a slope angle A of greater than 0° up to about 30°. See, for example, FIG. 9. It should be understood that slope angle A can be any number of degrees greater than 0° and up to about 30° in increments of 1.0°. For example, in some embodiments, slope angle A is about 20°. In other embodiments, slope angle A is about 15°.

6. The helmet 100 of embodiment 4 or 5, wherein the backward slope 17 comprises a slope angle A of about 15°.

Figure 3:
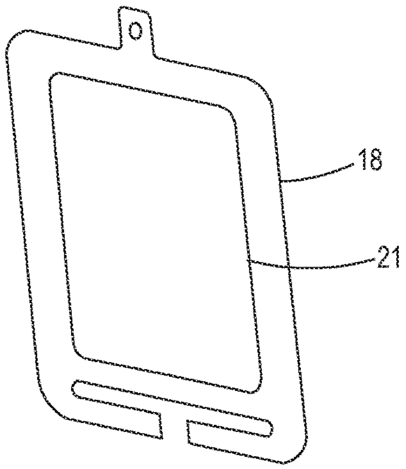
FIG. 3 depicts a perspective view of an exemplary fan guard suitable for use in the helmets of the present invention.
Figure 4A:
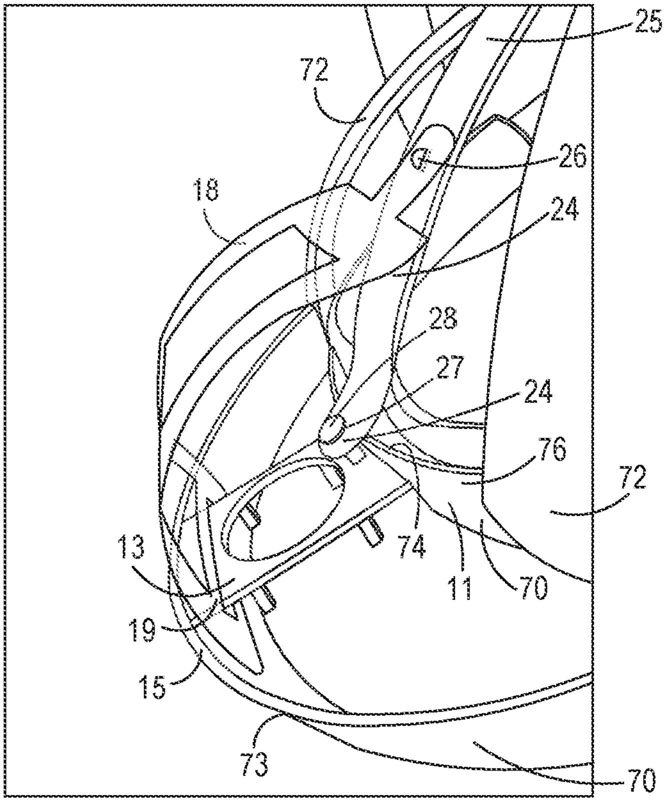
FIG. 4A-4B depict close-up views of exemplary fan guards and exemplary fan platforms used in the exemplary helmet of FIGS. 1-2B.
Figure 4B:
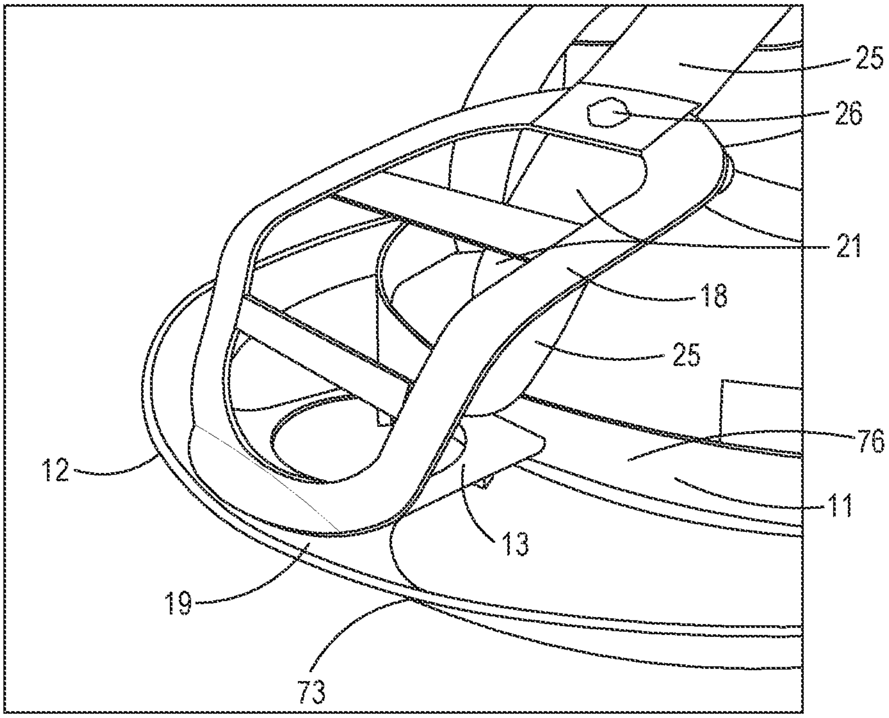

7. The helmet 100 of any one of embodiments 1 to 6, further comprising a fan guard 18 that is sized to extend over the fan platform 13 and the fan 14, the fan guard 18 preventing a hood 20 from coming into contact with the fan 14. See, for example, FIGS. 3, 4A-4B, and 7. As shown in FIGS. 3 and 4A-4B, fan guard 18 may have a number of shapes, sizes, and configurations.

8. The helmet 100 of embodiment 7, wherein the fan guard 18 is connectable to the main frame 10.

9. The helmet 100 of embodiment 7 or 8, wherein the fan guard 18 is connectable to an anterior position 19 along the fan platform 13.

10. The helmet 100 of any one of embodiments 7 to 9, wherein the fan guard 18 comprises a polymeric (e.g., polycarbonate) film having a film thickness of less than about 30 mil (0.76 mm). It should be understood that fan guard 18 may comprise any other material (e.g., other polymers, paper, foam, fabric, etc.), and having any desired thickness.

11. The helmet 100 of any one of embodiments 7 to 10, wherein the fan guard 18 comprises a polycarbonate film having a film thickness of about 15 mil (0.381 mm).

12. The helmet 100 of any one of embodiments 7 to 11, wherein the fan guard 18 has a fan guard aperture 21 extending therethrough, and the fan 14 pulls air thru the fan guard aperture 21.

13. The helmet 100 of any one of embodiments 7 to 12, wherein the fan 14 pulls air from above the fan platform 13 and below a lower surface 22 of the fan guard 18.

14. The helmet 100 of any one of embodiments 1 to 13, further comprising an anterior strap 23 that is connectable to or connected to the main frame 10 and comprises (i) a proximal end 24 for connecting to the main frame 10, (ii) a distal end 25, and (iii) an anterior strap connector 26 positioned between the proximal end 24 and the distal end 25.

15. The helmet 100 of embodiment 14, wherein the proximal end 24 of the anterior strap 23 comprises a proximal hole 27 for connecting to a corresponding anterior strap connector 28 on the main frame 10. See, for example, FIG. 4A.

Figure 2A:
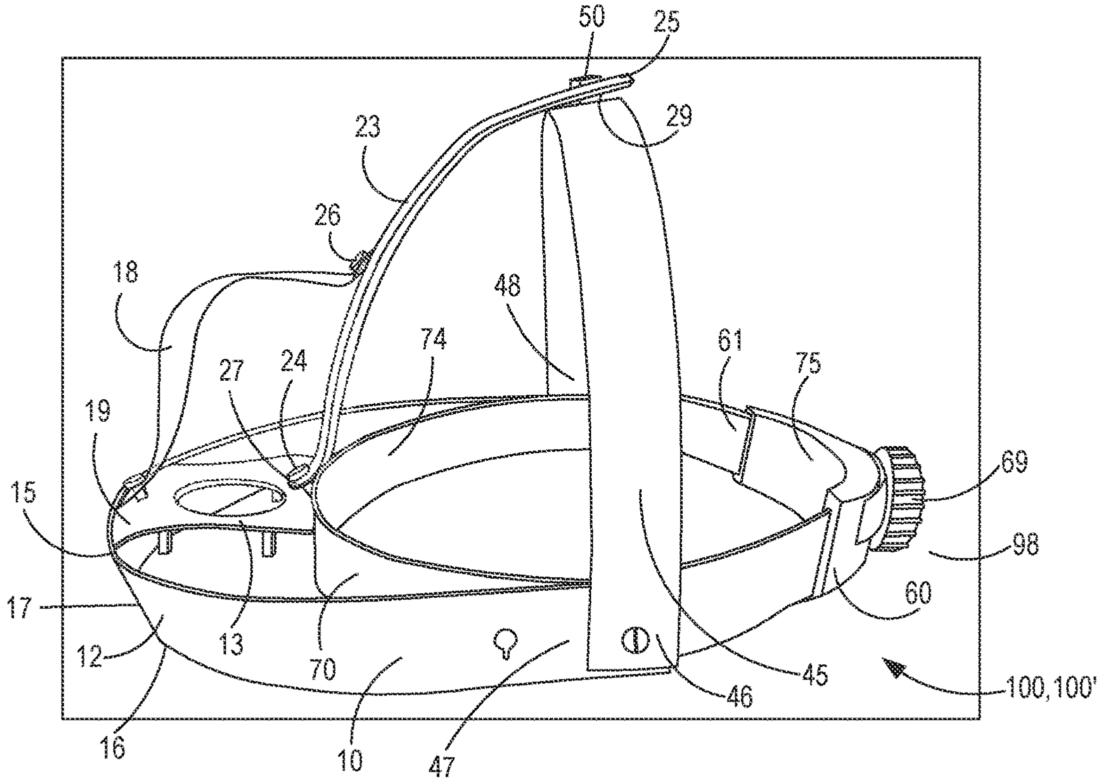
FIG. 2A depicts the exemplary helmet of FIG. 1 in an operational configuration (i.e., ready to be used by a user)
Figure 2B:
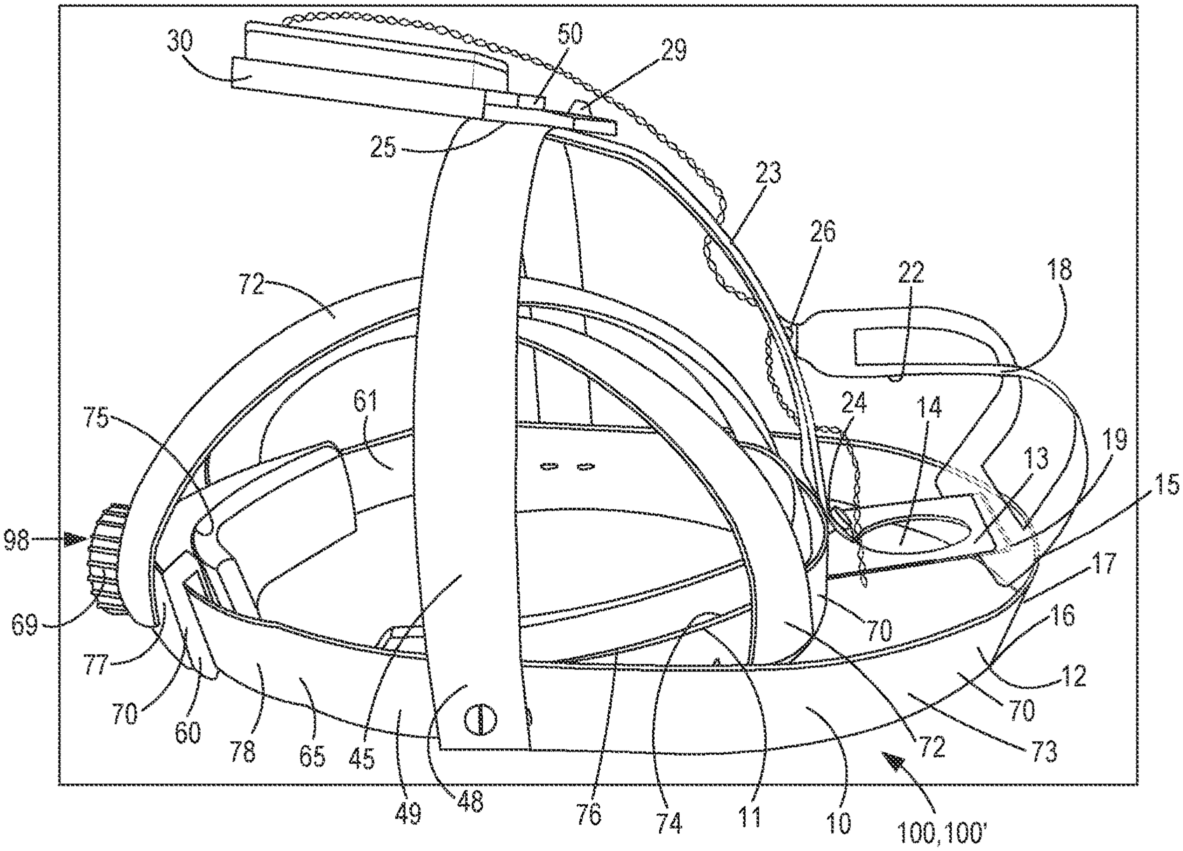
FIG. 2B depicts a variation of the exemplary helmet of FIG. 1 in an operational configuration (i.e., ready to be used by a user)

16. The helmet 100 of embodiment 14 or 15, wherein the distal end 25 of the anterior strap 23 comprises a distal connector 29 that enables connection to a battery housing 30 (as shown in FIG. 2B) or other helmet component (i.e., collapsible air channel 33 described below, or overhead strap connector 50, discussed below, and as shown in FIG. 2A).

17. The helmet 100 of any one of embodiments 14 to 16, wherein the anterior strap connector 26 is centrally located along the anterior strap 23 and comprises a fan guard pin 26.

18. The helmet 100 of any one of embodiments 14 to 17, wherein the fan guard 18 is connectable to or connected to the anterior strap connector 26 of the anterior strap 23. See, for example, FIGS. 2A-2B, 4A-4B, and 6.

19. The helmet 100 of any one of embodiments 14 to 18, wherein the fan guard 18 is sized to extend between and be connectable to or connected to (i) the anterior strap connector 26 of the anterior strap 23 and an anterior position 19 along the fan platform 23.

20. The helmet 100 of any one of embodiments 14 to 19, wherein the fan guard 18 is sized to be positioned above the fan 14 within the fan platform 13.

Figure 13:
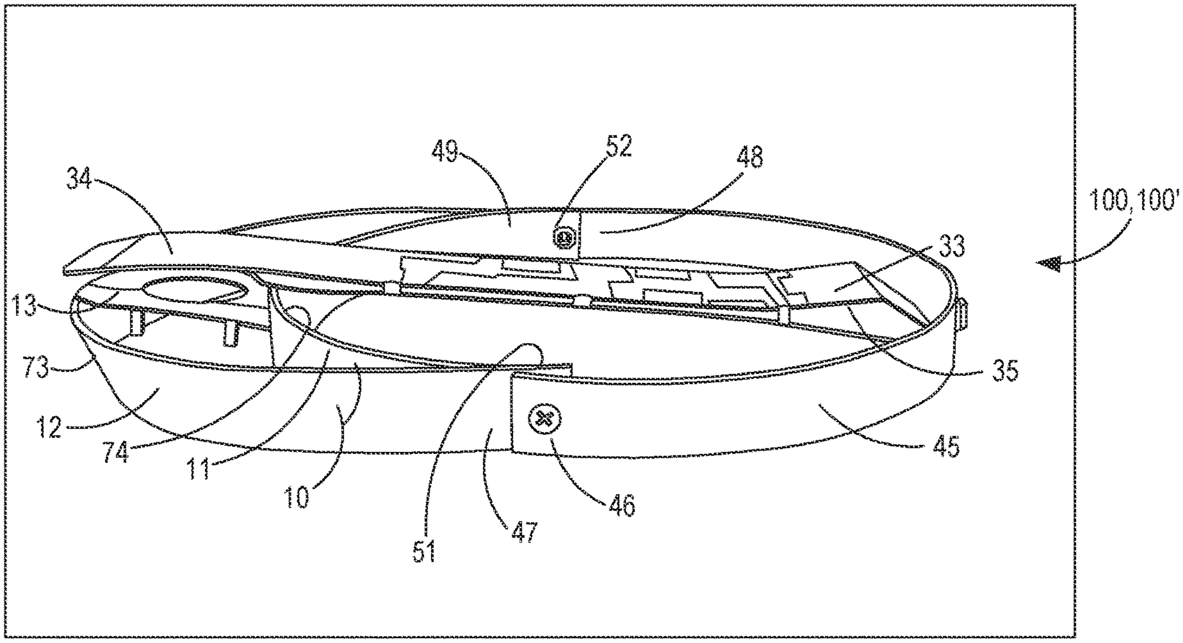
FIG. 13 depicts a perspective view of another exemplary helmet of the present invention in a shipping/storage configuration.
Figure 14:
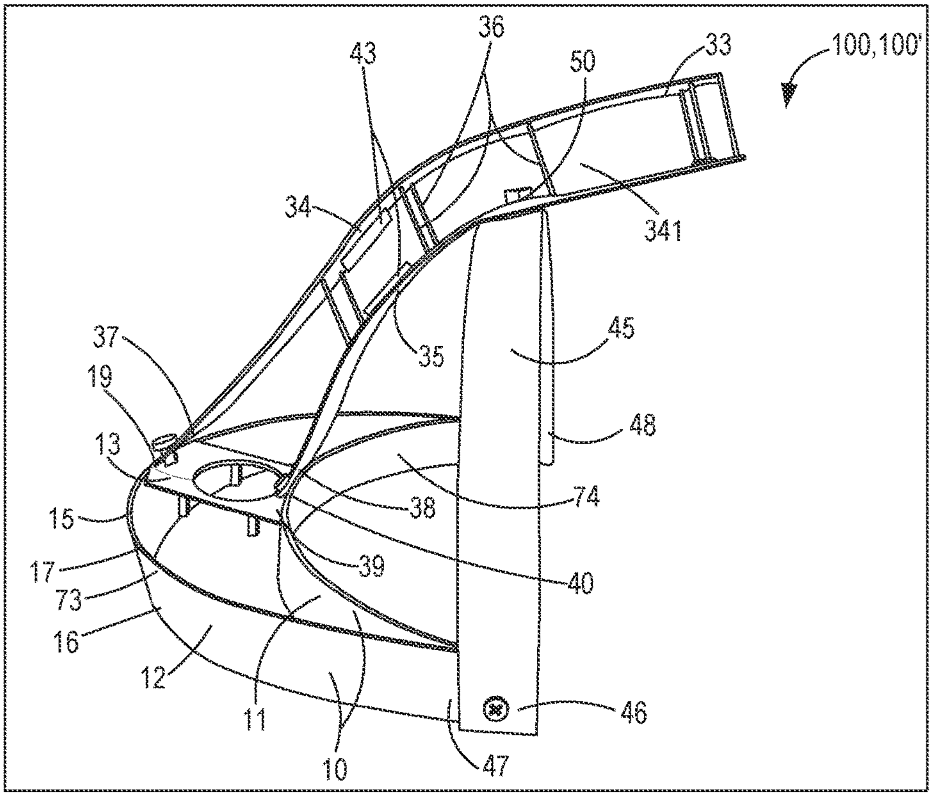
FIG. 14 depicts a side view of the exemplary helmet shown in FIG. 13 when in an operational configuration.
Figure 15:
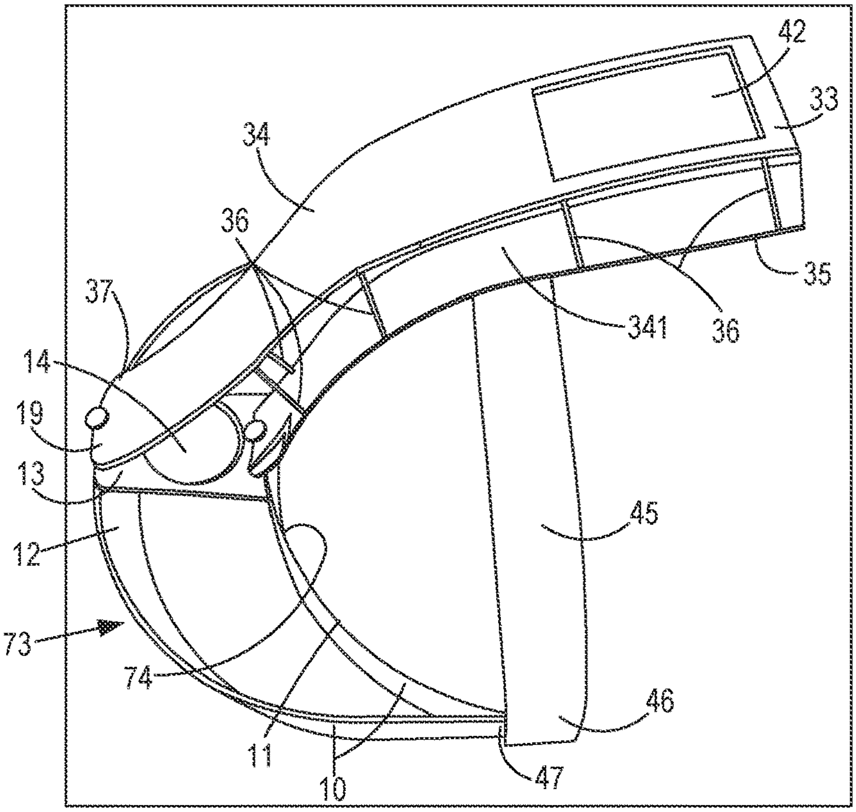
FIG. 15 depicts a perspective top view of the exemplary helmet shown in FIG. 14.

21. The helmet 100 of any one of embodiments 1 to 6, further comprising a collapsible air channel 33 that is sized to extend over the fan platform 13 and the fan 14, the collapsible air channel 33 preventing a hood material 87 of a hood 20 from coming into contact with the fan 14, wherein the collapsible air channel 33 is movable from a substantially flat, collapsed state (i.e., for shipping and storage as shown in FIG. 13) with no air channel therethrough to an operational state (i.e., a configuration for use as shown in FIGS. 14-15) with a formed air channel 341 extending therethrough.

22. The helmet 100 of embodiment 21, wherein the collapsible air channel 33 is connectable or connected to the main frame 10.

23. The helmet 100 of embodiment 21 or 22, wherein the collapsible air channel 33 is connectable or connected to an anterior position 19 along the fan platform 13.

24. The helmet 100 of any one of embodiments 21 to 23, wherein the collapsible air channel 33 comprises an upper layer of channel-forming material 34 (e.g., an upper strip 34 of polymer film or paper or both), a lower layer of channel-forming material 35 (e.g., a lower strip 35 of polymer film or paper or both), and one or more posts 36 positioned so as to separate the upper layer of channel-forming material 34 from the lower layer of channel-forming material 35. It should be understood that collapsible air channel 33 may have any desired configuration (e.g., cross-sectional shape, dimensions, etc.), and comprise any material as long as collapsible air channel 33 is collapsible. Suitable materials include, but are not limited to, polymers, paper, foam, metal, fabric, etc. In some embodiments, upper layer of channel-forming material 34, lower layer of channel-forming material 35, and one or more posts 36 of collapsible air channel 33 are each independently formed from a polymer (e.g., polypropylene or any other polymer). In other embodiments, upper layer of channel-forming material 34, and lower layer of channel-forming material 35 of collapsible air channel 33 are each independently formed from a paper or cellulosic material.

25. The helmet 100 of embodiment 24, wherein a front edge 37 of the upper layer of channel-forming material 34 is attached to an anterior position 19 along the fan platform 13.

26. The helmet 100 of embodiment 24 or 25, wherein a front edge 38 of the lower layer of channel-forming material 35 is attached to a posterior position 39 along the fan platform 13 or an anterior position 40 along the forehead strap 11.

27. The helmet 100 of any one of embodiments 21 to 26, wherein the collapsible air channel 33 further comprises one or more cover materials 41, said one or more cover materials 41 being sized to extend over at least a portion of (i) the upper channel-forming material 34, (ii) the lower layer of channel-forming material 35, and (iii) the one or more posts 36. See, for example, FIG. 16.

28. The helmet 100 of embodiment 27, wherein the one or more cover materials 41 comprise one or more fabrics, one or more films, or any combination thereof.

29. The helmet 100 of embodiment 27 or 28, wherein the one or more cover materials 41 comprise a fabric material 41.

30. The helmet 100 of embodiment 29, wherein the fabric material 41 comprises a stocking or sock-like material (e.g., a nylon hose material, etc.) or any other tubular material (e.g., a paper tubular material, a nonwoven tubular material, a foam tubular material, a knitted or woven fabric tubular material, etc.). For example, in some embodiments, the fabric material 41 comprises material similar to that used to form hood 20 described below, namely, hood material 87.

31. The helmet 100 of any one of embodiments 27 to 30, wherein the one or more cover materials 41 extend over substantially all of (i) the upper channel-forming material 34, (ii) the lower layer of channel-forming material 35, and (iii) the one or more posts 36.

32. The helmet 100 of any one of embodiments 21 to 31, wherein the collapsible air channel 33 has an air channel aperture 42 extending therein, and the fan 14 pulls air into and thru the air channel aperture 42 (i.e., air channel aperture 42 acts as an air inlet for collapsible air channel 33). See, for example, FIG. 15.

Figure 14A:
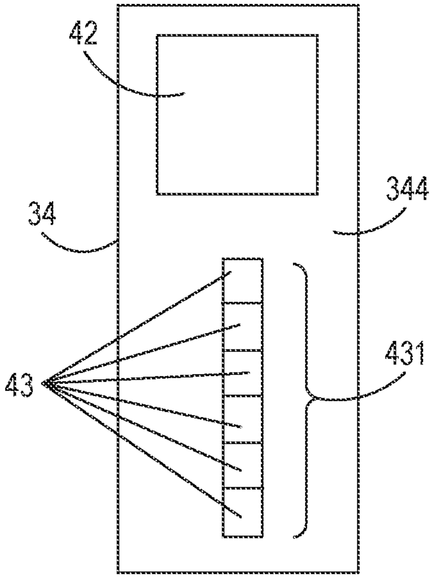
FIG. 14A depicts a view of an exemplary inner surface of the exemplary upper layer of channel-forming material shown in FIG. 14 with one or more UVC lights positioned thereon.
Figure 14B:
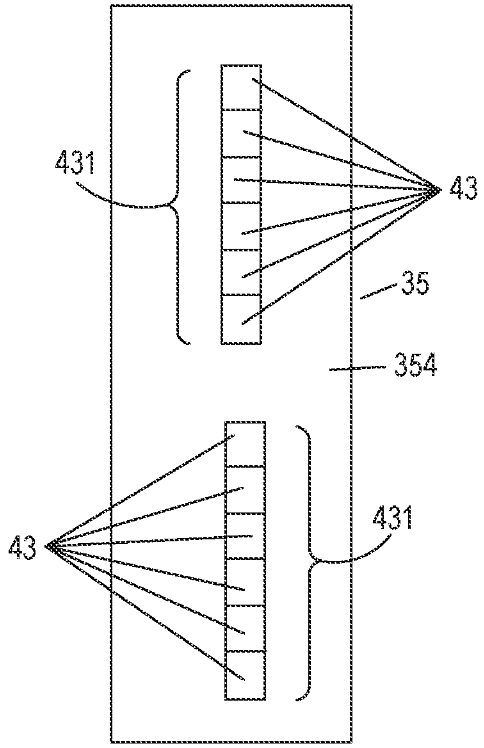
FIG. 14B depicts a view of an exemplary inner surface of the exemplary lower layer of channel-forming material shown in FIG. 14 with one or more UVC lights positioned thereon.

33. The helmet 100 of any one of embodiments 21 to 32, further comprising one or more UVC lights 43 positioned along an inner surface of the formed air channel 341 (e.g., along an inner surface of the collapsible air channel 33), the one or more UVC lights providing UVC light having a wavelength of from about 230 nanometers (nm) to about 275 nm. FIGS. 14A and 14B show arrays 431 of one or more UVC lights 43 positioned along (i) inner surface 344 of the upper channel-forming material 34 (FIG. 14A), and (ii) inner surface 354 of the lower layer of channel-forming material 35 (FIG. 14B). It should be understood that any number of UVC lights 43 and any number of UVC light arrays 431 may be used along any portion of the formed air channel 341 (e.g., along any inner surface of the collapsible air channel 33 formed by (i) the upper channel-forming material 34 (FIG. 14A), and (ii) the lower layer of channel-forming material 35 (FIG. 14B)).

34. The helmet 100 of embodiment 33, wherein the one or more UVC lights 43 comprise a linear array of LED lights 43 (e.g., from about 10 to 30 LED lights) positioned along (i) the upper channel-forming material 34, (ii) the lower layer of channel-forming material 35, or (iii) both the upper channel-forming material 34 and the lower layer of channel-forming material 35.

35. The helmet 100 of any one of embodiments 21 to 34, wherein the fan 14 pulls air (i) from above the fan platform 13 and (ii) from within the formed air channel 341.

36. The helmet 100 of any one of embodiments 1 to 35, further comprising an overhead strap 45 that is connectable to or connected to the main frame 10 and comprises (i) an overhead strap proximal end 46 for connecting to a first side 47 of the main frame 10, (ii) an overhead strap distal end 48 for connecting to an opposite side 49 of the main frame 10, and (iii) an overhead strap connector 50 positioned between the overhead strap proximal end 46 and the overhead strap distal end 48.

37. The helmet 100 of embodiment 36, wherein (a) the overhead strap proximal end 46 is connectable to or connected to a first rear end 51 of at least one of the forehead strap 11 and the anterior shield strap 12, and (b) the overhead strap distal end 48 is connectable to or connected to an opposite rear end 52 of at least one of the forehead strap 11 and the anterior shield strap 12.

Figure 16:
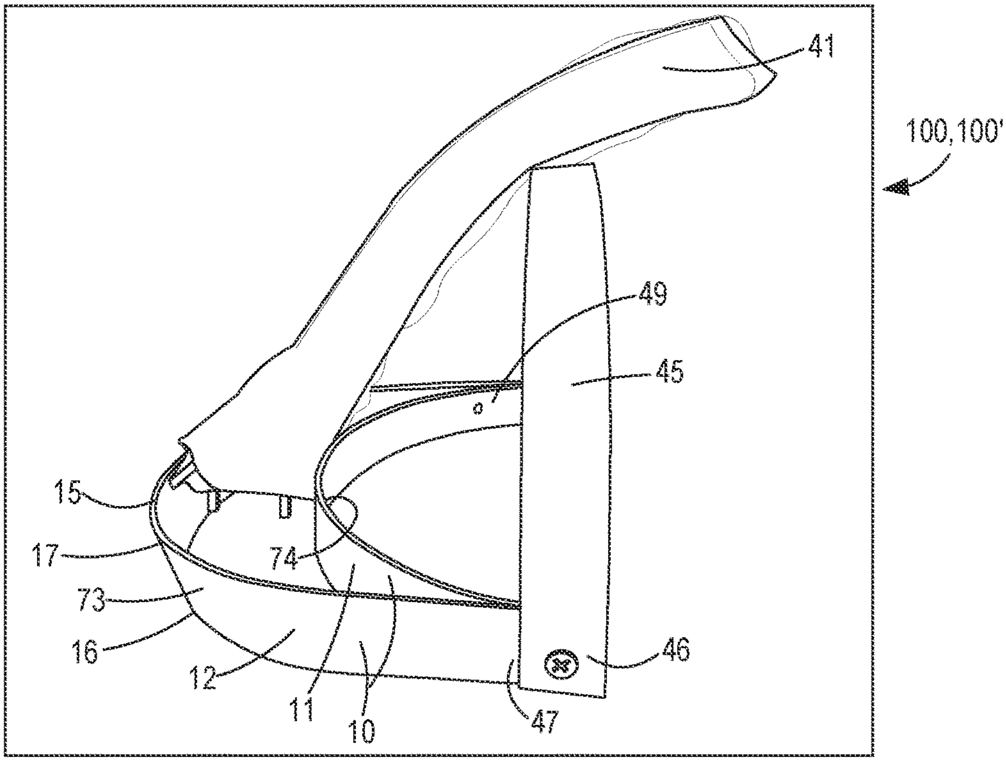
FIG. 16 depicts a side view of the exemplary helmet shown in FIG. 13 with hen in an operational configuration.

38. The helmet 100 of embodiment 36 or 37, wherein the overhead strap 45 is movable (i) from a first plane containing the forehead strap 11 and the anterior shield strap 12 (as shown in FIG. 13) into (ii) a second plane substantially normal to the first plane (as shown in FIGS. 14-16).

39. The helmet 100 of any one of embodiments 36 to 38, wherein the overhead strap connector 50 is connectable to or connected to the proximal connector 29 of the anterior strap 23.

See, for example, FIG. 2A.

40. The helmet 100 of any one of embodiments 36 to 39, wherein the overhead strap connector 50 is connectable to or connected to a battery housing 30. See, for example, FIG. 2B.

41. The helmet 100 of any one of embodiments 36 to 38, wherein the overhead strap connector 50 is connectable to or connected the collapsible air channel 33. See, for example, FIG. 14.

42. The helmet 100 of any one of embodiments 36 to 38 and 41, wherein the overhead strap connector 50 is connectable to or connected to the lower layer of channel-forming material 35 of the collapsible air channel 33.

43. The helmet 100 of any one of embodiments 36 to 38 and 41 to 42, wherein the overhead strap connector 50 is connectable to or connected to the lower layer of channel-forming material 35 of the collapsible air channel 33, and connection of the overhead strap connector 50 with the lower layer of channel-forming material 35 of the collapsible air channel 33 maintains the formed air channel 341 thru the collapsible air channel 33.

44. The helmet 100 of embodiment 36 or 37, wherein movement of the overhead strap 45 (*i*) from a first plane containing the forehead strap 11 and the anterior shield strap 12 (as shown in FIG. 13) to (ii) a second plane substantially normal to the first plane (as shown in FIG. 14) causes the collapsible air channel 33 to move from the collapsed state (i.e., for shipping and storage) to the operational state (i.e., in use).

45. The helmet 100 of any one of embodiments 1 to 44, further comprising a gear band 60 that is connectable to or connected to the main frame 10 and comprises (i) a first gear strap 61 comprising a first gear strap end 62 for connecting to the main frame 10 and a first gear strap opposite end 63, (ii) a second gear strap 64 comprising a second gear strap end 65 for connecting to the main frame 10 and a second gear strap opposite end 66, (iii) a gear box housing 67 that accepts and locks into place the first gear strap opposite end 63 and the second gear strap opposite end 66, (iv) a gear 68 within the gear box housing 67, the gear 68 adjusted a position of the first gear strap opposite end 63 and the second gear strap opposite end 68, and (v) a knob 69 for turning the gear 68, wherein the forehead strap 11 of the main frame 10 and the gear band 60 form a loop that is adjustably sized to fit onto a user's head by turning the knob 69.

46. The helmet 100 of any one of embodiments 1 to 45, further comprising one or more connectors 70 positioned along the main frame 10, the one or more connectors 70 enabling a face shield 80, one or more sweat bands 72, or both to be attached to the main frame 10.

47. The helmet 100 of embodiment 46, wherein the one or more connectors 70 are positioned along a front surface 73 of the anterior shield strap 12.

48. The helmet 100 of embodiment 46 or 47, wherein the one or more connectors 70 are positioned along the backward slope 17 of the anterior shield strap 12.

49. The helmet 100 of any one of embodiments 46 to 48, wherein the one or more connectors 70 comprise strips of hook material or loop material 70.

50. The helmet 100 of any one of embodiments 1 to 49, further comprising one or more sweat bands 72.

51. The helmet 100 of embodiment 50, wherein the one or more sweat bands 72 are positioned along a posterior surface 74 of the forehead strap 11.

52. The helmet 100 of embodiment 50 or 51, wherein the one or more sweat bands 72 are positioned along an anterior surface 75 of the gear box housing 60.

53. The helmet 100 of any one of embodiments 50 to 52, wherein the one or more sweat bands 72 independently extend from (a) a first connector 70 along an outer surface 76 of the forehead strap 11 to (b) a second connector 70 along (i) an outer surface 77 of the gear box housing 60 or (ii) an outer surface 78 of the first gear strap 61 or the second gear strap 64. Each of the one or more sweat bands 72 may be independently adjusted to extend a given length between (a) the first connector 70 along an outer surface 76 of the forehead strap 11 and (b) the second connector 70 along (i) an outer surface 77 of the gear box housing 60 or (ii) an outer surface 78 of the first gear strap 61 or the second gear strap 64.

54. The helmet 100 of embodiment 53, wherein two sweat bands 72 independently extend from (a) a first connector 70 along an outer surface 76 of the forehead strap 11 to (b) a second connector 70 along (i) an outer surface 77 of the gear box housing 60 or (ii) an outer surface 78 of the first gear strap 61 or the second gear strap 64. This crossed sweat band configuration is shown, for example, in FIGS. 2B, and 10-11, and each of the two sweat bands 72 may be independently adjusted to extend a desired independent length between (a) the first connector 70 along an outer surface 76 of the forehead strap 11 and (b) the second connector 70 along (i) an outer surface 77 of the gear box housing 60 or (ii) an outer surface 78 of the first gear strap 61 or the second gear strap 64.

55. The helmet 100 of any one of embodiments 1 to 54, further comprising a battery housing 30.

Figure 10:
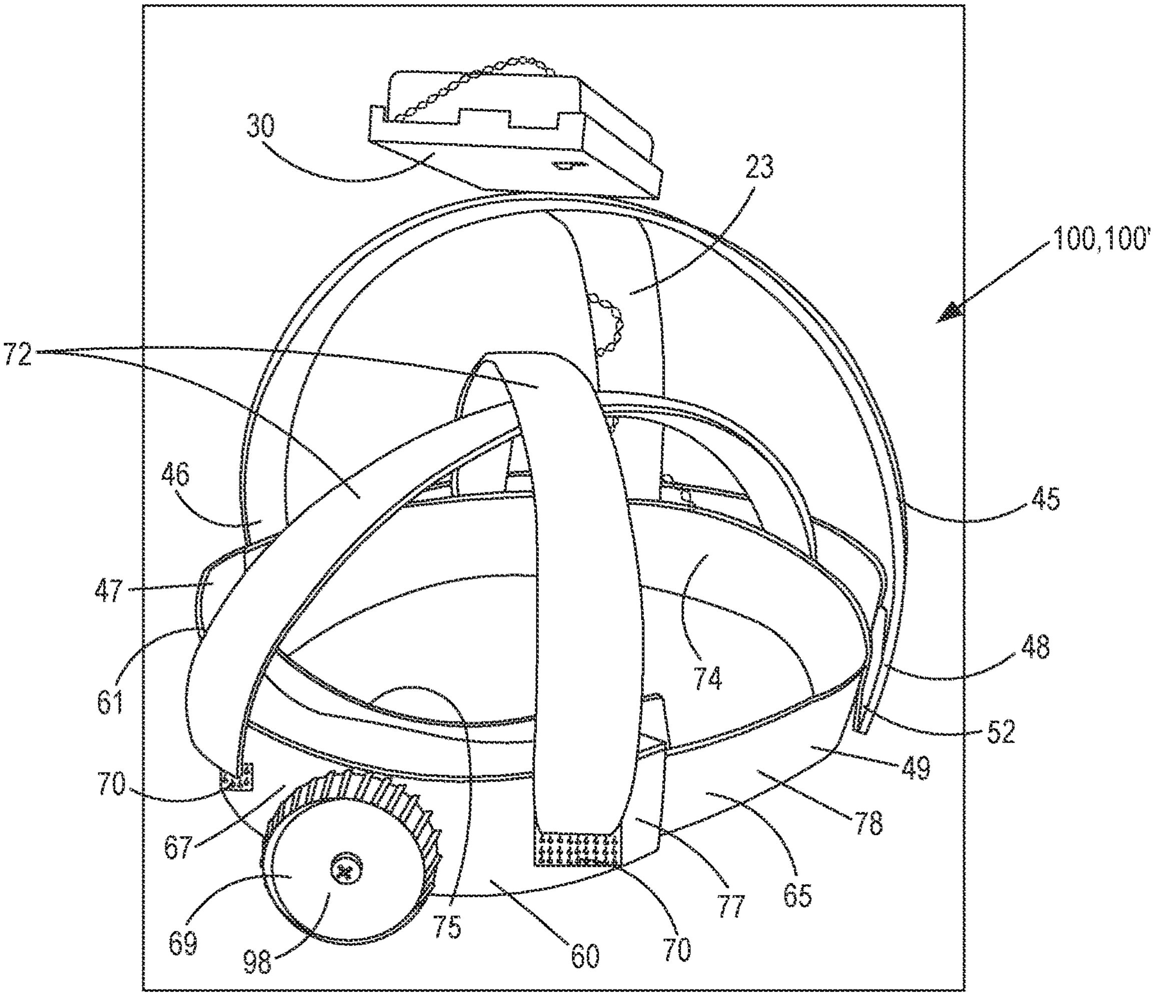
FIG. 10 depicts of a rear view of the exemplary helmet shown in FIG. 2B.
Figure 11:
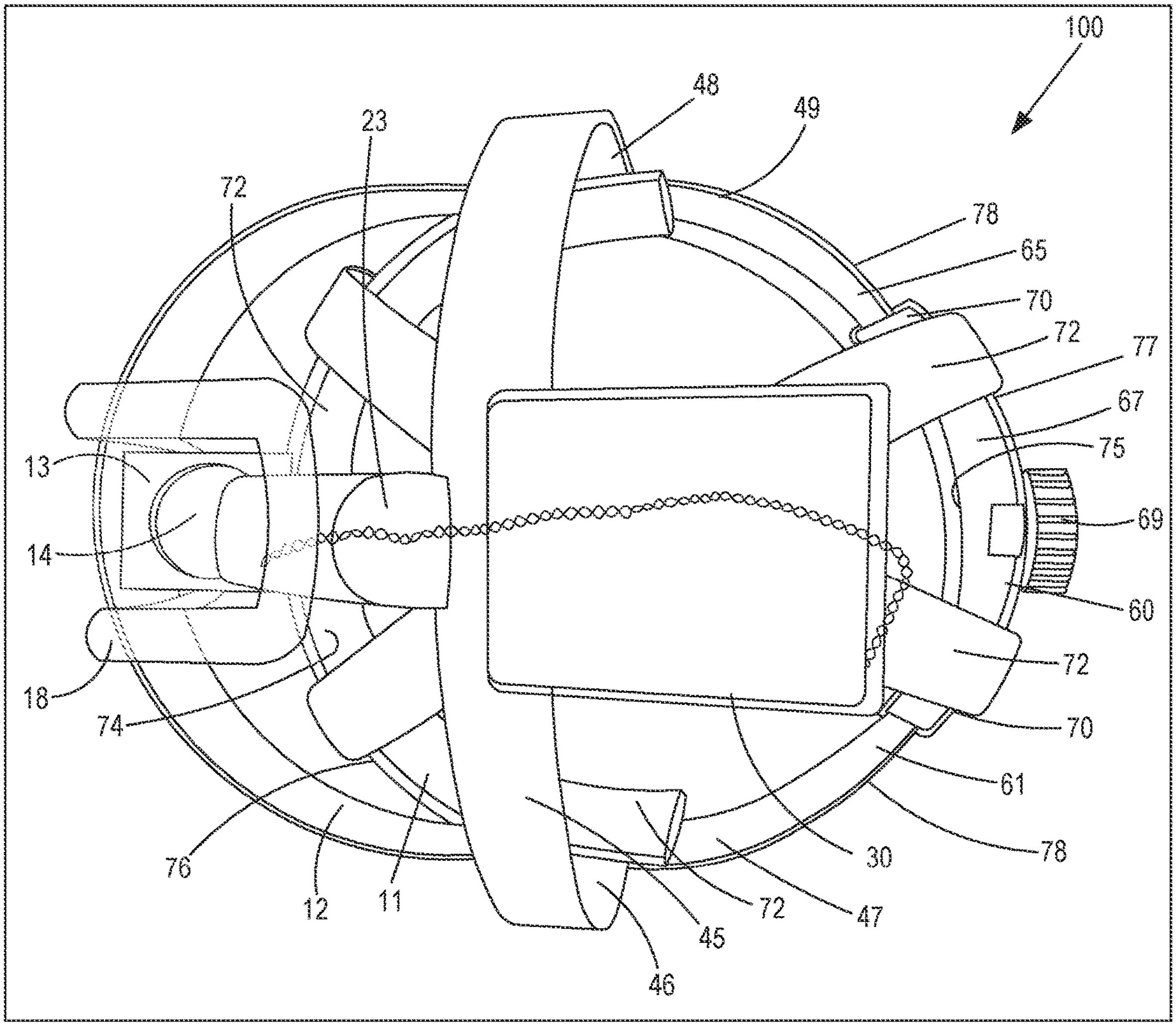
FIG. 11 depicts a top view of the exemplary helmet shown in FIG. 2B.
Figure 12:
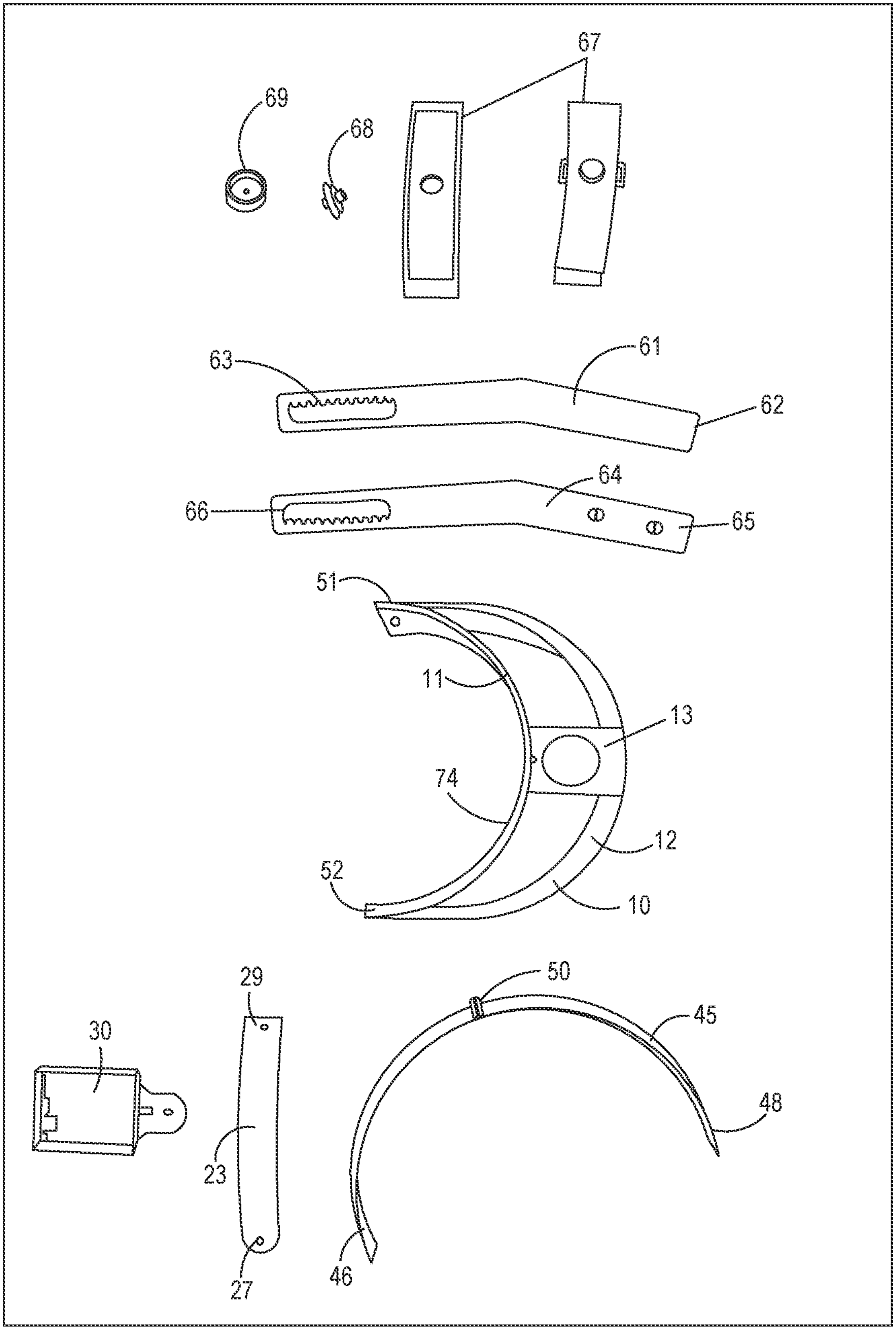
FIG. 12 depicts a top view of various components used to form the exemplary helmet shown in FIGS. 1-2B.

56. The helmet 100 of embodiment 55, wherein the battery housing 30 is connectable to or connected to the main frame 10. As shown in FIGS. 2B and 10-11, in some embodiments, battery housing 30 is connectable to and/or connected to the main frame 10. However, as shown in FIGS. 2A and 14-16, in other embodiments, battery housing 30 is not connected to the main frame 10, but instead, may be worn along a user's beltline (not shown) with one or more wires electrically connecting the battery housing 30, directly or indirectly, to fan 14.

57. The helmet 100 of embodiment 55 or 56, wherein the battery housing 30 is connectable to or connected to the anterior strap 12.

58. The helmet 100 of embodiment 55 or 56, wherein the battery housing 30 is connectable to or connected to the overhead strap connector 50.

59. The helmet 100 of embodiment 55, wherein the battery housing 30 is connectable to or connected to or positioned along a waist line of a user (not shown).

60. The helmet 100 of any one of embodiments 55 to 59, wherein the battery housing 30 further comprises one or more batteries (not shown) positioned within the battery housing 30.

Figure 8:
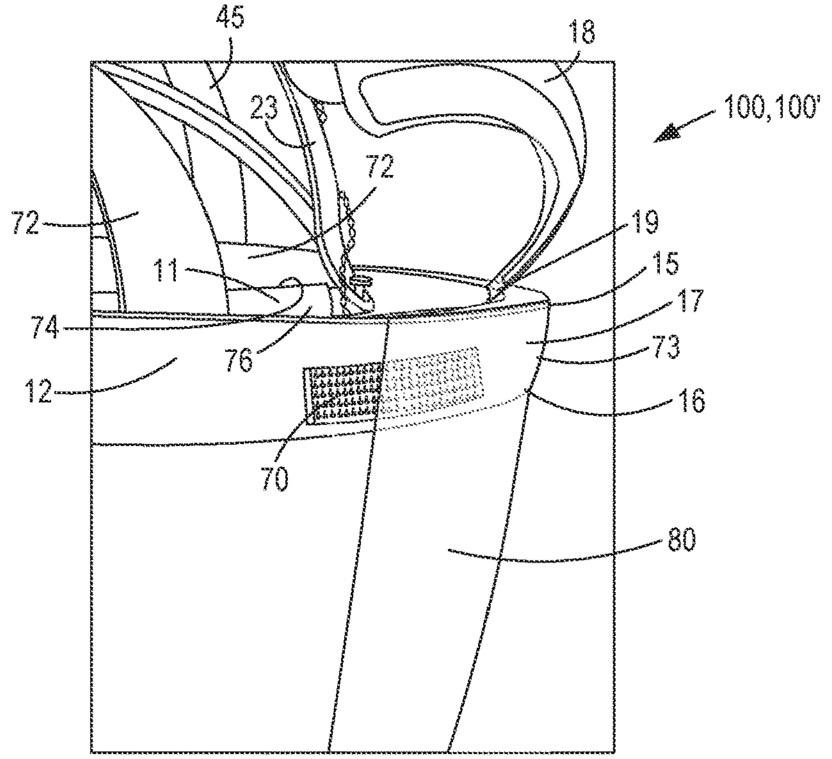
FIG. 8 depicts a close-up side view of an exemplary face shield attached to a backward slope of the exemplary main frame of the exemplary helmet shown in FIG. 2B.

61. The helmet 100 of any one of embodiments 1 to 60, further comprising a face shield 80 that is connectable to or connected to the main frame 10. See, for example, FIG. 8.

62. The helmet 100 of embodiment 61, wherein the face shield 80 is connectable to or connected to a front surface 73 of the anterior shield strap 12 so as to extend below the anterior shield strap 12 (and in front of a face of a user (not shown)).

63. The helmet 100 of embodiment 61 or 62, wherein the face shield 80 is connectable to or connected to the backward slope 17 of the anterior shield strap 12 so as to extend below the anterior shield strap 12 and towards a face of a user (not shown) (i.e., towards a chin of the user).

64. The helmet 100 of any one of embodiments 61 to 63, wherein the face shield 80 is connectable to or connected to the main frame 10 via one or more strips of hook material or loop material 70.

65. The helmet 100 of any one of embodiments 1 to 64, further comprising a hood 20 comprising hood material 87 that is attachable to the main frame 10 so as to extend below the main frame 10 and cover at least a portion of a user's head and/or neck and/or shoulders. See, for example, FIGS. 17-21). It should be understood that hood material 87 may comprise any material typically used to form a given hood. For example, hood material 87 may comprise a nonwoven material such as a spunlaced material, a spunbonded material, a meltblown material, other types of nonwoven materials, woven materials, film materials, or any combination thereof. In some embodiments, hood material 87 comprises a nonwoven (e.g., spunlaced) polypropylene material having a basis weight of about 40.0 grams per square meter (gsm).

Figure 17:
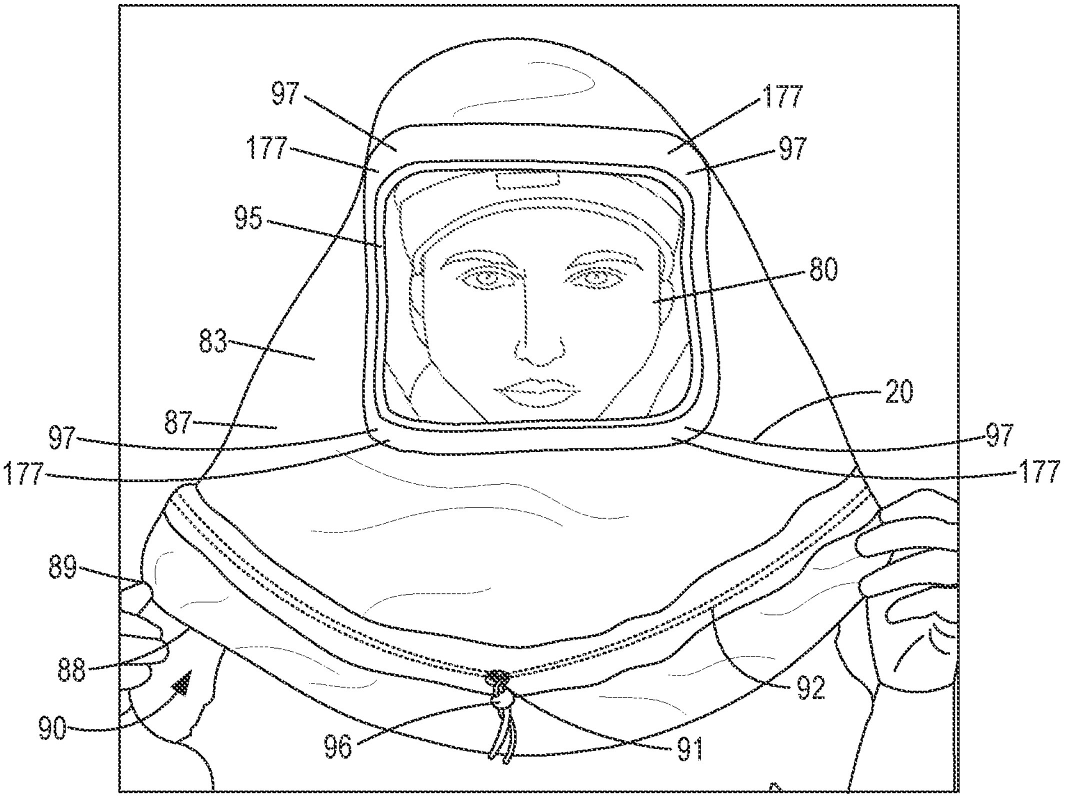
FIG. 17 depicts a front view of an exemplary hood suitable for use with the exemplary helmets shown in FIGS. 1-16 with a tie-string component of the hood in a loose configuration.
Figure 18:
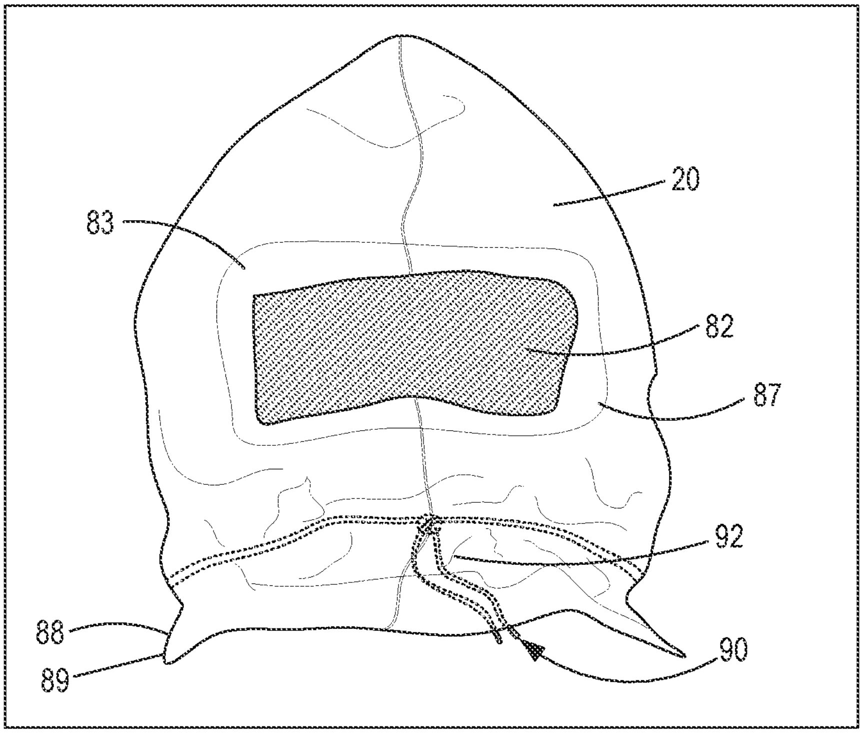
FIG. 18 depicts a rear view of the exemplary hood shown in FIG. 17.
Figure 19:
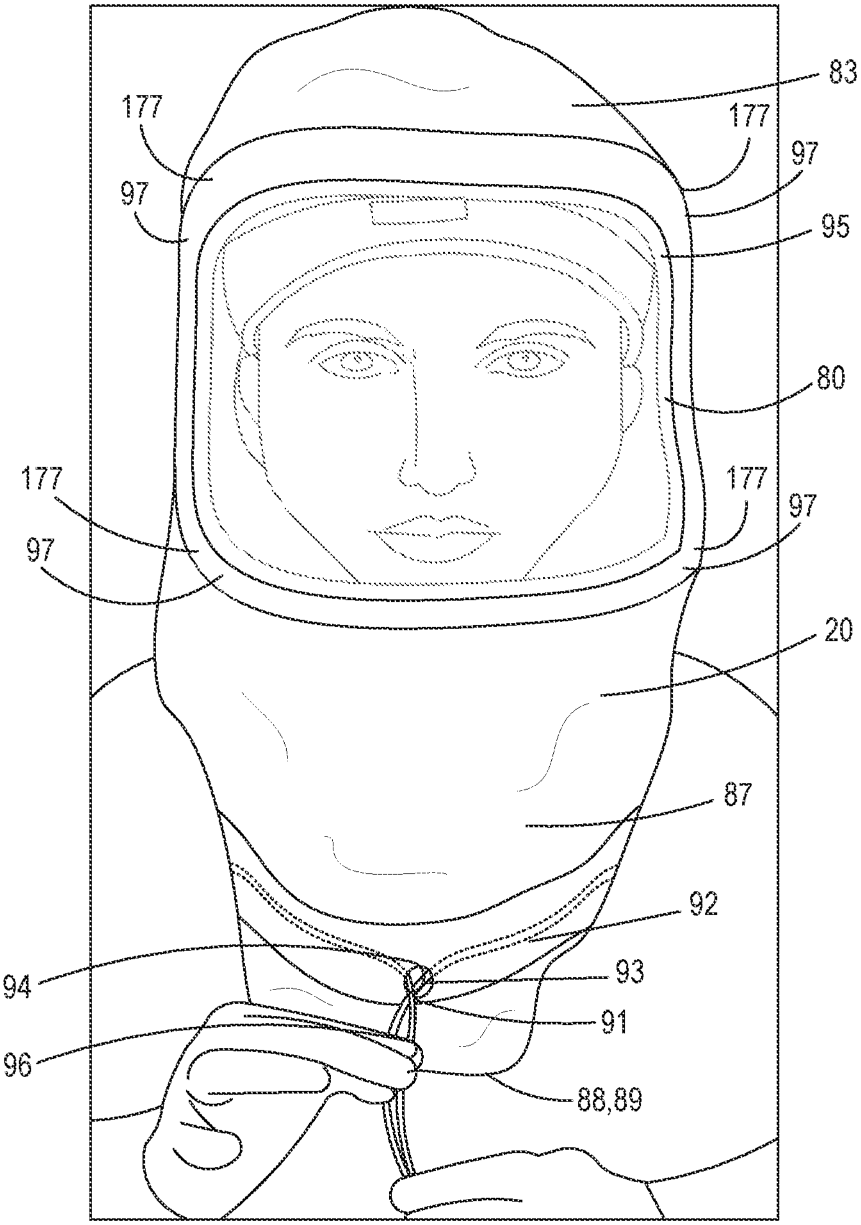
FIG. 19 depicts a front view of the exemplary hood shown in FIG. 17 with the tie-string component of the hood in a tightened configuration.
Figure 20:
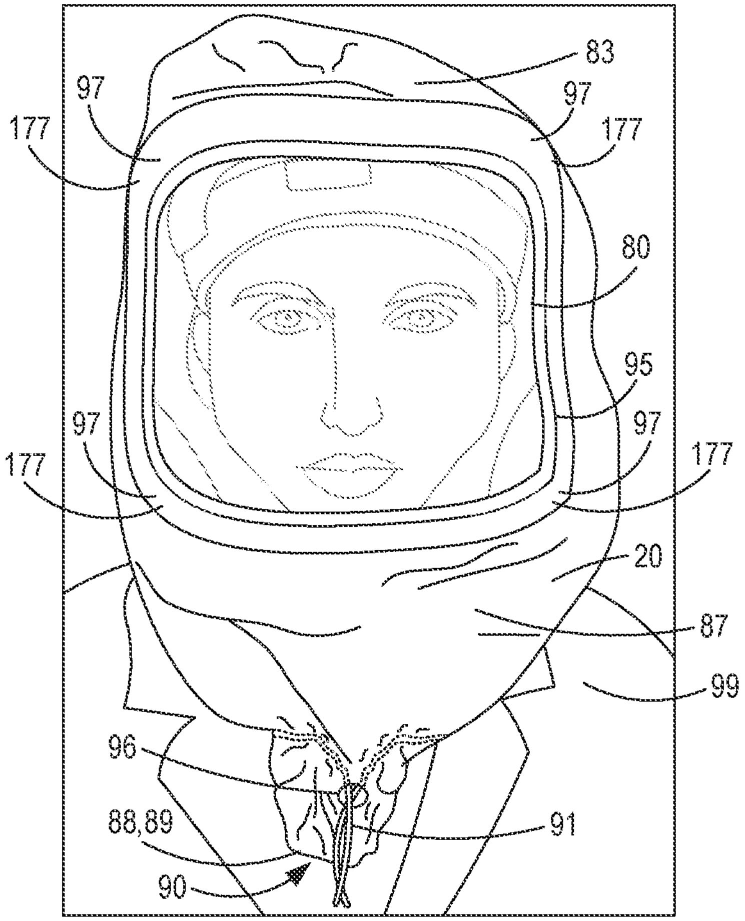
FIG. 20 depicts another front view of the exemplary hood shown in FIG. 17 with the tie-string component of the hood in a tightened configuration and a lower portion of the hood beneath a surgical coat or gown.
Figure 21:
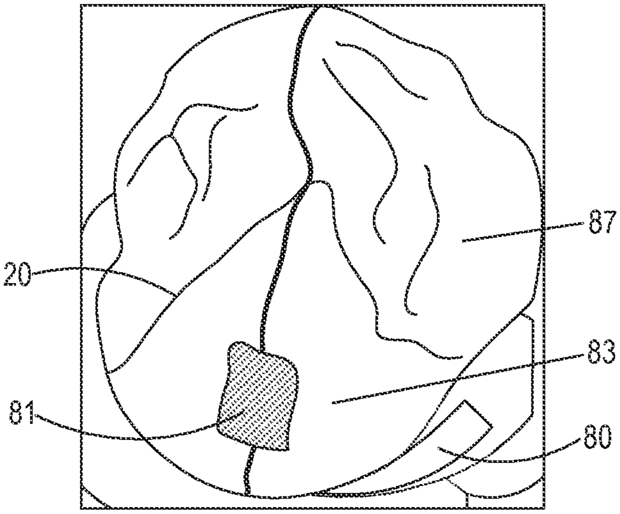
FIG. 21 depicts a top view of the exemplary hood shown in FIG. 17.

66. The helmet 100 of embodiment 65, wherein the hood material 87 is sized to extend over a user's head and down to a neck/shoulder region of the user, and the hood further comprises a face shield opening 95 extending through the hood material 87 and along a front side of the hood 20. See again, FIGS. 17, 19 and 20. As shown in FIGS. 17, 19 and 20, face shield 80 is positioned within face shield opening 95 and attached to hood material 87 surrounding face shield opening 95. With this configuration, hood 20 with face shield 80 is attached to main frame 10 of helmet 100 via one or more connectors 70 positioned along (i) face shield 80 (e.g., the one or more connectors 70 comprising loop material) and (ii) front surface 73 of the anterior shield strap 12 of main frame 10 (e.g., the one or more connectors 70 comprising hook material).

67. The helmet 100 of embodiment 65 or 66, wherein the hood 20 comprises an air inlet hole 81 disposed centrally above the helmet 100 and along and through hood material 87. See, for example, FIG. 21. For example, in embodiments in which the helmet 100 comprises collapsible air channel 33, air inlet hole 81 is positioned within hood material 87 so as to align with the air channel aperture 42 extending through upper channel-forming material 34 of collapsible air channel 33.

68. The helmet 100 of any one of embodiments 65 to 67, wherein the hood 20 further comprises an air filter (not shown) positioned next to and covering the air inlet hole 81. The air filter may comprise a HEPA (high-efficiency particulate absorbing) filter, or any other similar type of air filter.

69. The helmet 100 of any one of embodiments 65 to 68, wherein the hood 20 comprises one or more air outlet holes 82 disposed along and through the hood material 87. See, for example, FIG. 18.

70. The helmet 100 of any one of embodiments 65 to 69, wherein the hood 20 comprises one or more air outlet holes 82 disposed along and through a rear portion of the hood material 87. See again, FIG. 18, wherein air outlet hole 82 is disposed along and through a rear portion of the hood material 87 so as to be positioned along a lower, rear portion of a user's head and above the user's neck line.

71. The helmet 100 of any one of embodiments 65 to 70, wherein the hood material 87 further comprises a lower edge 88 extending along a lower periphery 89 of the hood material 87 and around a hood opening 90 of the hood 20, and a tie-string 91 positioned proximate the lower edge 88 and extending along at least a portion of the lower periphery 89 of the hood material 87, the tie-string 91 enabling a user to reduce a circumference of the hood opening 90 from an initial circumference to an in-use circumference. See, for example, the initial circumference in FIG. 17 and the in-use circumference in FIG. 20.

72. The helmet 100 of embodiment 71, wherein the tie-string 91 is positioned from about 4.0 inches to about 10.0 inches above the lower edge 88.

73. The helmet 100 of embodiment 71 or 72, wherein the tie-string 91 extends along substantially all of the lower periphery 89 of the hood material 87.

74. The helmet 100 of any one of embodiments 71 to 73, wherein the hood 20 further comprises a tie-string channel 92 that extends along at least a portion of the lower periphery 89 of the hood material 87, the tie-string channel 92 comprising a tie-string channel inlet 93 and a tie-string channel outlet 94. See, for example, FIG. 19, which shows tie-string 91 entering tie-string channel inlet 93 and exiting tie-string channel outlet 94.

75. The helmet 100 of embodiment 74, wherein the tie-string channel 92 extends along substantially all of the lower periphery 89 of the hood material 87.

76. The helmet 100 of embodiment 74 or 75, wherein the tie-string channel 92 comprises (i) hood material 87 and (ii) an overlapping piece of channel material (not shown) positioned over and along an inner surface (not shown) or an outer surface 83 of the hood material 87. In FIGS. 17-20, exemplary tie-string channel 92 comprises (i) hood material 87 positioned about 3.0 in above lower edge 88 and extending along substantially all of lower periphery 89, and (ii) an overlapping piece of channel material (not shown) positioned over and along an inner surface (not shown) of the hood material 87.

77. The helmet 100 of any one of embodiments 71 to 76, further comprising a tie-string locking device 96 that is movable along the tie-string 91 so as to move from (i) a first locked position corresponding to the hood opening 90 having the initial circumference in a non-use position to (ii) a second locked position corresponding to the hood opening 90 having the in-use circumference.

78. The helmet 100 of any one of embodiments 71 to 77, wherein the tie-string 91 has a length of from about 20 inches to about 36 inches.

79. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; wherein the anterior shield strap 12 has an upper front edge 15, a lower front edge 16, and a backward slope 17 extending between the upper front edge 15 and the lower front edge 16.

80. The helmet 100 of embodiment 79, wherein the backward slope 17 comprises a slope angle A of greater than 0° up to about 30°. Typically, slope angle A greater than 10° up to about 20°.

81. The helmet 100 of embodiment 79 or 80, wherein the backward slope 17 comprises a slope angle A of about 15°.

82. The helmet 100 of any one of embodiments 79 to 81, further comprising one or more of the recited features as recited in embodiments 7 to 78.

83. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; and a fan guard 18 that is sized to extend over the fan platform 13 and the fan 14, the fan guard 18 preventing a hood 20 from coming into contact with the fan 14.

84. The helmet 100 of embodiment 83, further comprising one or more of the recited features as recited in embodiments 4 to 6 and 8 to 78.

85. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; and a collapsible air channel 33 that is sized to extend over the fan platform 13 and the fan 14, the collapsible air channel 33 preventing a hood material 87 of a hood 20 from coming into contact with the fan 14, wherein the collapsible air channel 33 is movable from a collapsed state (i.e., for shipping and storage as shown in FIG. 13) to an operational state (i.e., for use as shown in FIGS. 14-15).

86. The helmet 100 of embodiment 85, further comprising one or more of the recited features as recited in embodiments 4 to 6 and 22 to 78.

87. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; an air channel 341 that is sized to extend (i) from over the fan platform 13 and the fan 14 to (ii) a position over a user's head (not shown); and one or more UVC lights 43 positioned along the air channel 341 (e.g., along an inner surface of the collapsible air channel 33), the one or more UVC lights 43 comprising one or more UVC lights having a light wavelength of from about 230 nanometers (nm) to about 275 nm.

88. The helmet 100 of embodiment 87, further comprising one or more of the recited features as recited in embodiments 4 to 32 and 34 to 78.

89. The helmet 100 of any one of embodiments 1 to 88, wherein the fan 14 comprises a low voltage, low noise fan having an operating voltage of less than about 10 volts (V), and a noise level of less than about 35 decibels (dB) as measured using test method CNS 8753 or test method ISO 3744.

90. The helmet 100 of any one of embodiments 1 to 89, wherein the fan 14 has an operating voltage of less than about 8.0 V, and a noise level of less than about 29 decibels (dB) as measured using test method CNS 8753 or test method ISO 3744.

91. The helmet 100 of any one of embodiments 1 to 90, wherein the fan 14 comprises a low voltage, low noise fan having an operating voltage of from about 4.0 V to about 7.0 V, and a noise level of about 25 decibels (dB) as measured using test method CNS 8753 or test method ISO 3744.

92. The helmet 100 of any one of embodiments 1 to 91, wherein the fan 14 has an operating power consumption of from about 0.6 watts (W) to about 0.9 W, and a fan speed of about 7000 revolutions per minute (RPM).

93. A single-use, disposable helmet 100 comprising: a main frame 10 comprising a forehead strap 11 and an anterior shield strap 12 with a fan platform 13 positioned between the forehead strap 11 and the anterior shield strap 12; and a fan 14 positioned within the fan platform 13; an air channel 341 that is sized to extend (i) from over the fan platform 13 and the fan 14 to (ii) a position over a user's head (not shown), wherein the fan 14 comprises a low voltage, low noise fan having an operating voltage of less than about 10 volts (V), and a noise level of less than about 35 decibels (dB) as measured using test method CNS 8753 or test method ISO 3744.

94. The helmet 100 of embodiment 93, further comprising one or more of the recited features as recited in embodiments 4 to 78.

95. The helmet 100 of any one of embodiments 79 to 94, wherein the helmet 100 is collapsible into a volume having a length of up to about 16.0 inches, a width of up to about 20.0 inches, and a height of up to about 3.5 inches when fully assembled.

96. The helmet 100 of any one of embodiments 79 to 95, wherein the helmet 100 is collapsible into a volume having a length of up to 14.0 inches, a width of up to about 18.5 inches, and a height of up to about 2.5 inches when fully assembled.

97. The helmet 100 of any one of embodiments 79 to 96, wherein the helmet 100 is collapsible into a volume having a length of up to 12.0 inches, a width of up to about 17.0 inches, and a height of up to about 1.5 inches when fully assembled.

98. The helmet 100 of any one of embodiments 79 to 97, wherein, when expanded from its collapsible state (i.e., shipping and/or storage state) into a "use" or operational state, the helmet 100 expands into an in-use helmet 100 having a length of about 11.0 inches, a width of about 11.0 inches, and a height of about 10.0 inches.

99. A hood 20 comprising: hood material 87 sized to extend over a user's head and down to a neck/shoulder region of the user, said hood material 87 comprising: (i) a face shield opening 95 extending through the hood material 87 and along a front side of the hood 20, and (ii) a lower edge 88 extending along a lower periphery 89 of the hood material 87 and around a hood opening 90 of the hood 20; and a tie-string 91 positioned proximate the lower edge 88 and extending along at least a portion of the lower periphery 89 of the hood material 87, the tie-string 91 enabling a user to reduce a circumference of the hood opening 90 from an initial circumference to an in-use circumference. See, for example, the initial circumference in FIG. 17 and the in-use circumference in FIG. 20.

100. The hood 20 of embodiment 99, further comprising: a face shield 80 positioned within face shield opening 95 and attached to hood material 87 surrounding face shield opening 95.

101. The hood 20 of embodiment 99 or 100, further comprising: an air inlet hole 81 disposed centrally above the helmet 100 and along and through hood material 87. See, for example, FIG. 21.

102. The hood 20 of embodiment 101, further comprising: an air filter (not shown) positioned next to and covering the air inlet hole 81. As discussed above, the air filter may comprise a HEPA air filter.

103. The hood 20 of any one of embodiments 99 to 102, further comprising: one or more air outlet holes 82 disposed along and through the hood material 87. See, for example, FIG. 18.

104. The hood 20 of any one of embodiments 99 to 103, further comprising: one or more air outlet holes 82 disposed along and through a rear portion of the hood material 87. See again, FIG. 18, wherein air outlet hole 82 is disposed along and through a rear portion of the hood material 87 so as to be positioned along a lower, rear portion of a user's head and above the user's neck line.

105. The hood 20 of any one of embodiments 99 to 104, wherein the tie-string 91 is positioned from about 4.0 inch to about 10.0 inches above the lower edge 88.

106. The hood 20 of any one of embodiments 99 to 105, wherein the tie-string 91 extends along substantially all of the lower periphery 89 of the hood material 87.

107. The hood 20 of any one of embodiments 99 to 106, further comprising: a tie-string channel 92 that extends along at least a portion of the lower periphery 89 of the hood material 87, the tie-string channel 92 comprising a tie-string channel inlet 93 and a tie-string channel outlet 94.

See, for example, FIG. 19, which shows tie-string 91 entering tie-string channel inlet 93 and exiting tie-string channel outlet 94.

108. The hood 20 of embodiment 107, wherein the tie-string channel 92 extends along substantially all of the lower periphery 89 of the hood material 87.

109. The hood 20 of embodiment 107 or 108, wherein the tie-string channel 92 comprises (i) hood material 87 and (ii) an overlapping piece of channel material (not shown) positioned over and along an inner surface (not shown) or an outer surface 83 of the hood material 87. As discussed above, in FIGS. 17-20, exemplary tie-string channel 92 comprises (i) hood material 87 positioned about 3.0 inches above lower edge 88 and extending along substantially all of lower periphery 89, and (ii) an overlapping piece of channel material (not shown) positioned over and along an inner surface (not shown) of the hood material 87.

110. The hood 20 of any one of embodiments 99 to 109, further comprising a tie-string locking device 96 that is movable along the tie-string 91 so as to move from (i) a first locked position corresponding to the hood opening 90 having the initial circumference in a non-use position to (ii) a second locked position corresponding to the hood opening 90 having the in-use circumference.

111. The hood 20 of any one of embodiments 99 to 110, wherein the tie-string 91 has a length of from about 20 inches to about 36 inches.

Figure 22:
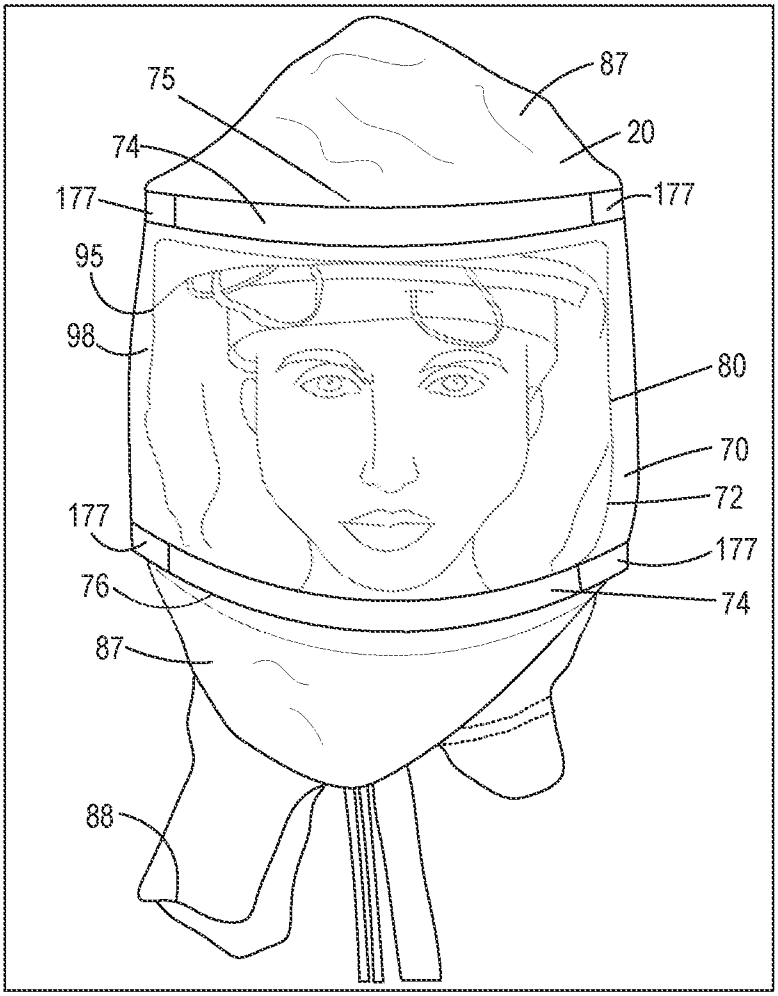
FIG. 22 depicts a front view of another exemplary hood of the present invention.
Figure 23:
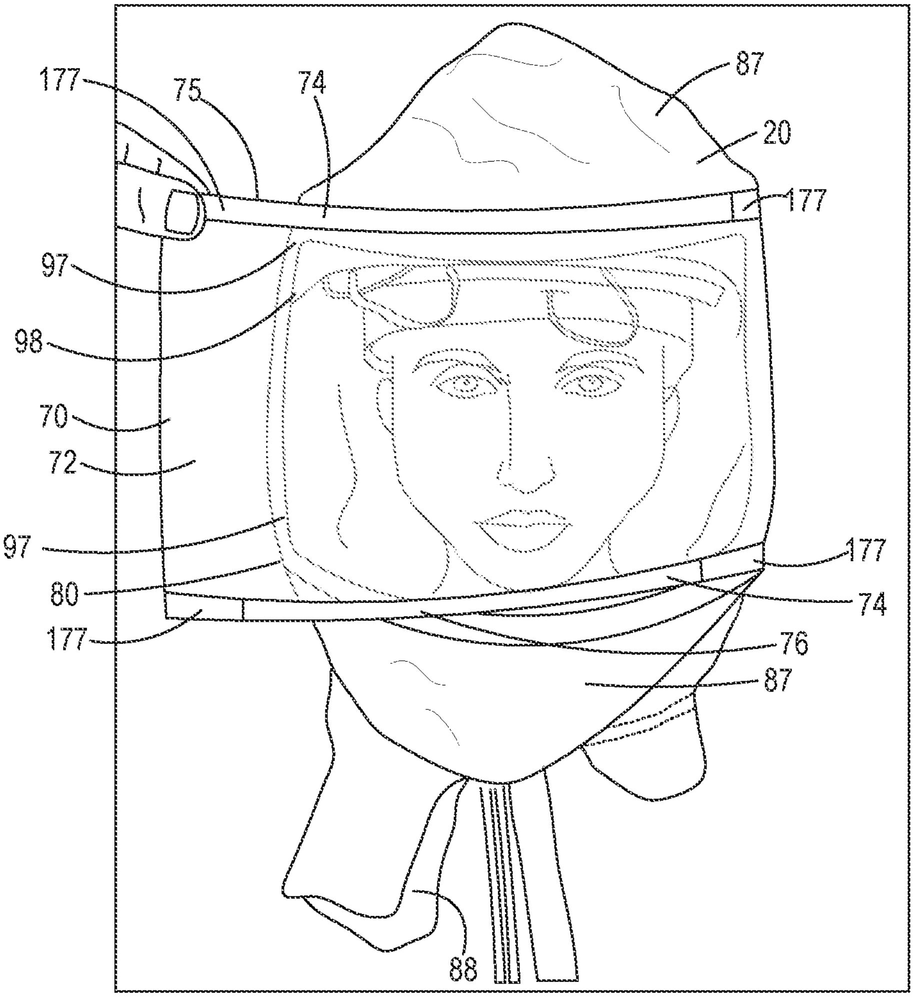
FIG. 23 depicts a view of the exemplary hood shown in FIG. 22 during removal of an exemplary removable stick-on face shield guard from the hood.
Figure 24:
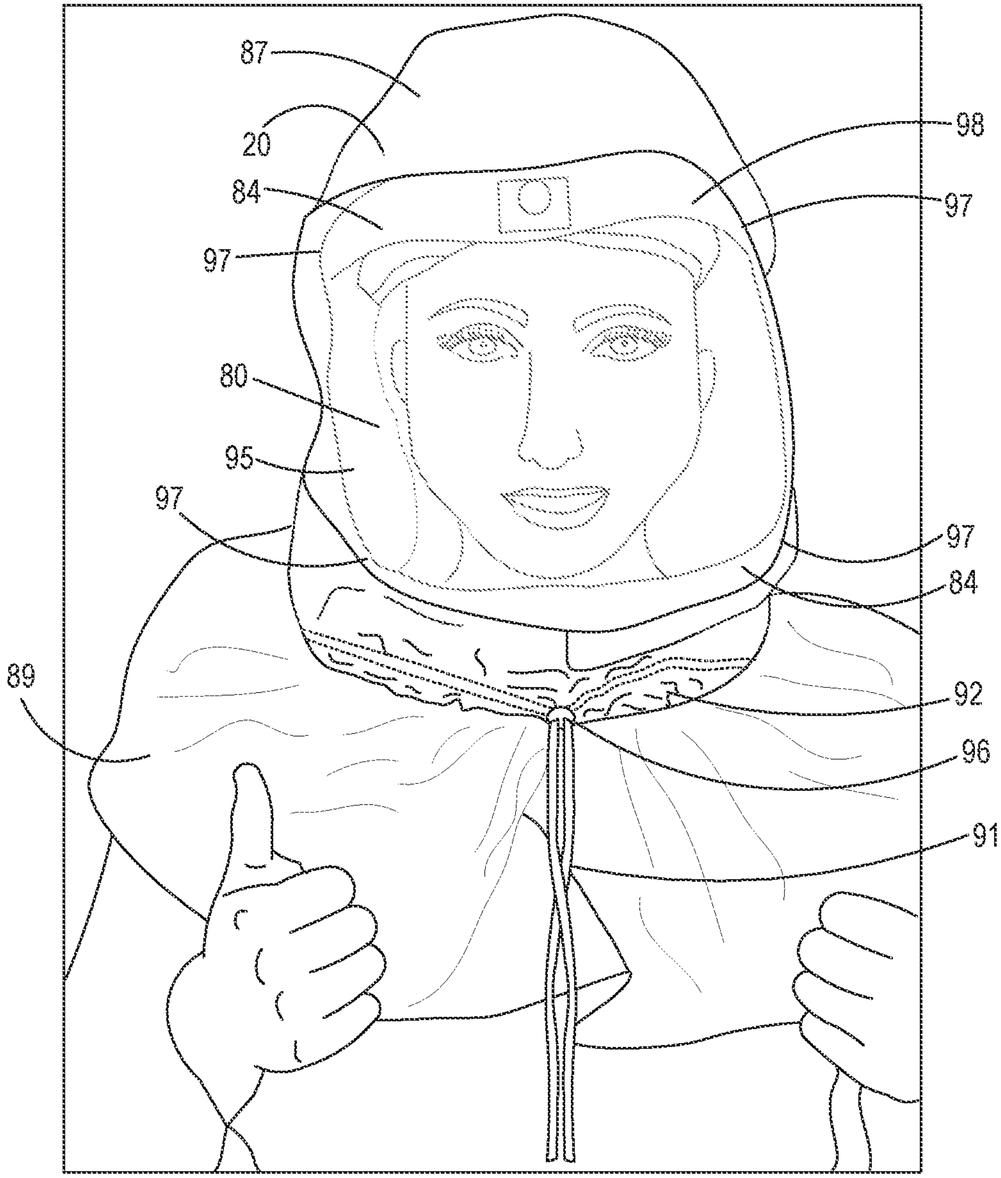
FIG. 24 depicts a view of the exemplary hood shown in FIG. 22 after removal of the exemplary removable stick-on face shield guard from the hood.

112. A single-use, disposable hood 20 comprising: hood material 87 sized to extend over a user's head and down to a neck/shoulder region of the user, the hood material 87 comprising: (i) a face shield opening 95 extending through the hood material 87 and along a front side of the hood 20, and (ii) a lower edge 88 extending along a lower periphery 89 of the hood material 87 and around a hood opening 90 of the hood 20; a fixed face shield 80 attached to the hood material 87 and covering the face shield opening 95; two or more hood connecting members 97 positioned along an outer periphery 98 of the face shield opening 95; and at least one removable stick-on face shield guard 70 sized to extend over the face shield opening 95 and be removably attachable to the hood 20, each of said at least one removable stick-on face shield guard 70 comprises (i) a transparent face shield material 72, and (ii) two or more face shield guard connecting components 177, the two or more face shield guard connecting components 177 being attachable to and/or connectable to and/or engageable with the two or more hood connecting members 97. As shown in FIGS. 22-24, fixed face shield 80 is positioned within face shield opening 95 and attached to hood material 87 surrounding face shield opening 95. As further shown in FIGS. 22-24, removable stick-on face shield guard 70 is removable from hood 20 so as to expose fixed face shield 80. As discussed above, each of (i) the two or more hood connecting members 97, and (ii) the two or more face shield guard connecting components 177 may independently comprise a VELCRO® hook and loop component, a magnet, an adhesive component, a different mechanical fastener (e.g., a male/female connector such as snaps and snap receivers), etc. As used herein, the phrase "magnet" or "magnetic metal" refers to a metal that is magnetically attracted to a magnet such as one of the two or more hood connecting members 97 when formed from magnetic material. Suitable "magnetic metals" include, but are not limited to, steel, iron, iron-containing metals, cobalt, nickel, and other ferromagnetic metals. In some embodiments, each of (i) the two or more hood connecting members 97, and (ii) the two or more face shield guard connecting components 177 comprise a VELCRO® hook or loop component.

113. The hood 20 of embodiment 112, wherein the two or more hood connecting members 97 are positioned along an outer periphery 84 of the fixed face shield 80. See, for example, FIG. 24.

114. The hood 20 of embodiment 112 or 113, wherein the two or more hood connecting members 97 are positioned underneath at least one layer of the hood material 87. It should be understood that although the two or more hood connecting members 97 are typically positioned underneath at least one layer of the hood material 87, in some embodiments, at least a portion of the two or more hood connecting members 97 may be positioned along hood material 87 or fixed face shield 80 so as to be exposed (i.e., one or more outer surfaces of the two or more hood connecting members 97 comes into direct contact with a given removable stick-on face shield guard 70 or one or more face shield guard connecting components 127 of the removable stick-on face shield guard 70).

115. The hood 20 of any one of embodiments 112 to 114, wherein the two or more hood connecting members 97 comprise four hood connecting members 97, and the four hood connecting members 97 are positioned at four corners of the face shield opening 95 (i.e., an upper left-hand corner, an upper right-hand corner, a lower left-hand corner, and a lower right-hand corner). See, for example, FIG. 24.

116. The hood 20 of any one of embodiments 112 to 115, wherein the fixed face shield 80 is adhesively attached to the hood material 87 so as to cover the face shield opening 95. It should be understood that any method may be used to permanently connect the fixed face shield 80 to the hood material 87 so as to cover the face shield opening 95. Other possible methods include, but are not limited to, ultrasonic welding, melt-bonding, etc.

117. The hood 20 of any one of embodiments 112 to 116, wherein the fixed face shield 80 is attached to the hood material 87 so as to prevent particles or fluid from entering the hood 20 through the face shield opening 95 or the hood material 87 surrounding the face shield opening 95.

118. The hood 20 of any one of embodiments 112 to 117, wherein the fixed face shield 80 comprises a transparent polymer sheet. Typically, the fixed face shield 80 has a face shield thickness of less than about 30 mils (i.e., 0.030 inch), more typically, from about 3 to about 20 mils, and even more typically, from about 5 to about 10 mils.

119. The hood 20 of any one of embodiments 112 to 118, wherein the fixed face shield 80 comprises a transparent polycarbonate sheet (e.g., a LEXAN® sheet or film).

Figure 25A:
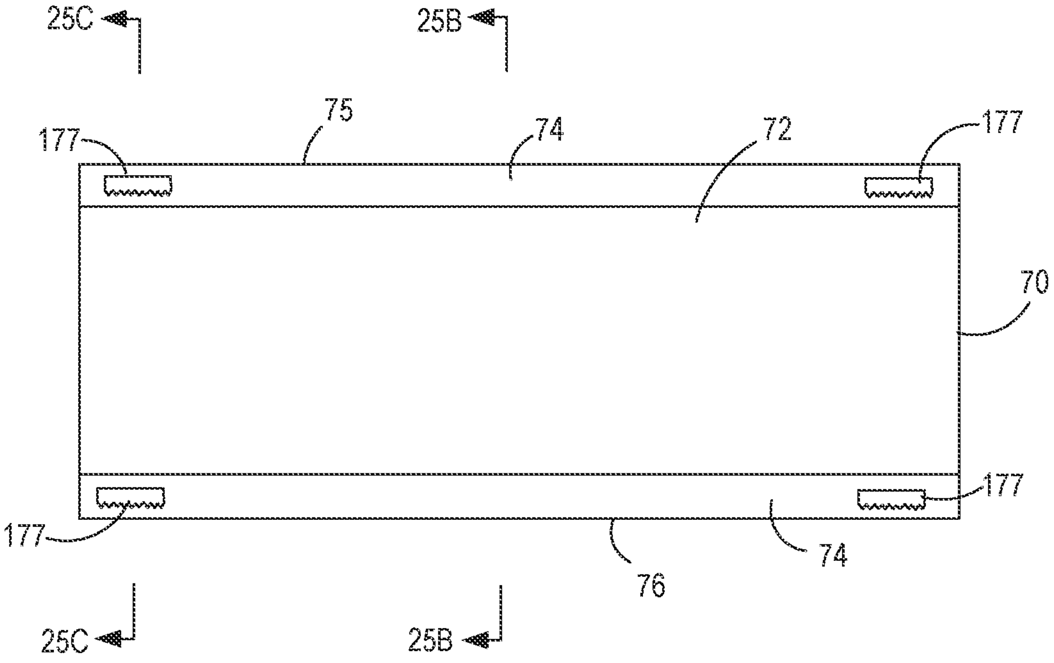
FIGS. 25A-25D depict various views of an exemplary removable stick-on face shield guard of the hood.
Figure 25B:
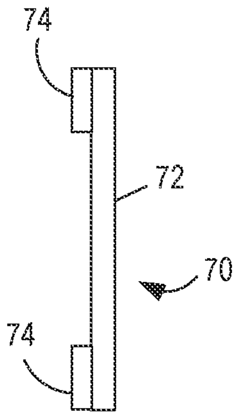
Figure 25C:
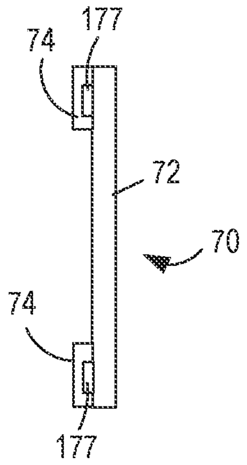
Figure 25D:
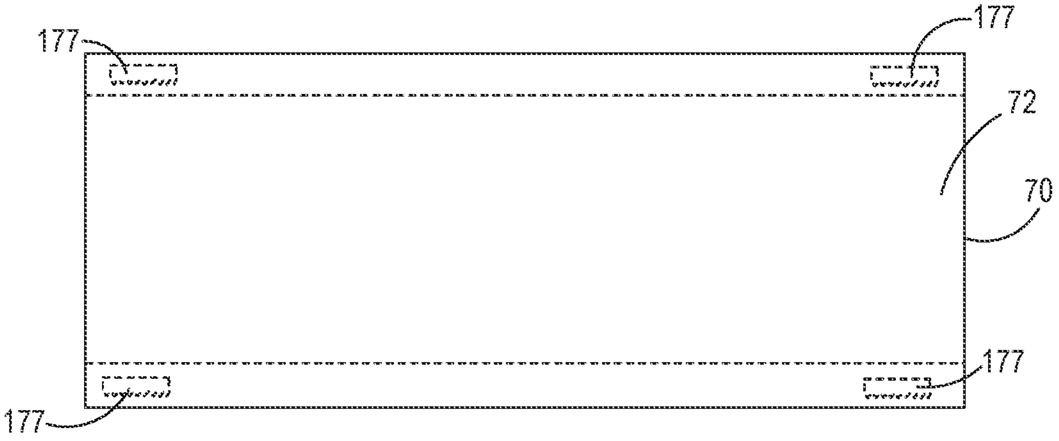

120. The hood 20 of any one of embodiments 112 to 119, wherein each of the at least one removable stick-on face shield guard 70 has a substantially rectangular shape. See, for example, FIG. 25A.

121. The hood 20 of any one of embodiments 112 to 120, wherein each of the at least one removable stick-on face shield guard 70 comprises four face shield guard connecting components 177. See, for example, FIGS. 25A-25D. It should be understood that although the two or more face shield guard connecting components 177 are typically positioned underneath strip material 74 (i.e., not exposed), in some embodiments, at least a portion of the face shield guard connecting components 177 may be positioned along transparent face shield material 72 so as to be exposed (i.e., one or more outer surfaces of the two or more face shield guard connecting components 177 comes into direct contact with a given hood 20 or one or more hood connecting members 97 of the hood 20). Further, typically, each of the face shield guard connecting components 127 has a component thickness of less than about 3.0 millimeters (mm) (about 118.2 mil). In some embodiments, each of the face shield guard connecting components 177 comprises a steel disc having an overall size and thickness similar to or less than the size of a penny. In other embodiments, each of the face shield guard connecting components 177 comprises a loop material component (or a hook material component) having an overall length of less than about 2.0 inches (in) (or any length ranging from about 0.5 in to about 3.0 in, in increments of 0.1 in).

122. The hood 20 of embodiment 121, wherein the four face shield guard connecting components 177 are positioned at four corners of a given removable stick-on face shield guard 70 (i.e., an upper left-hand corner, an upper right-hand corner, a lower left-hand corner, and a lower right-hand corner). See again, FIGS. 25A-25D.

123. The hood 20 of any one of embodiments 112 to 122, wherein each of the at least one removable stick-on face shield guard 70 comprises a strip of material 74 extending horizontally along opposite edges 75/76 of a given removable stick-on face shield guard 70. See again, FIGS. 25A-25D. Strip of material 74 may comprise any strip of material including, but not limited to, tape, reinforced tape (e.g., tape with a backing layer, the backing layer comprising a fiber-containing layer such as unidirectional fibers or a nonwoven or woven scrim), a polymer film layer, a paper layer, an adhesive layer, or any combination thereof. Typically, strip of material 74 comprise a clear (e.g., transparent) or tinted (e.g., so as to have a color other than white) adhesive tape. Strip of material 74 may be used to provide reinforcement to a given removable stick-on face shield guard 70, to provide a unique look for a given removable stick-on face shield guard 70, and/or to secure one or more face shield guard connecting components 177 to the transparent face shield material 72.

124. The hood 20 of any one of embodiments 112 to 123, wherein the at least one removable stick-on face shield guard 70 comprises a single removable stick-on face shield guard 70 attached to the hood 20 so as to extend over the face shield opening 95 and the fixed face shield 80. See again, FIGS. 22-24.

125. The hood 20 of any one of embodiments 112 to 123, wherein the at least one removable stick-on face shield guard 70 comprises two or more removable face shields 70 with each of the two or more removable face shields 70 being separately attachable to the hood 20 so as to extend over the face shield opening 95 and the fixed face shield 80. The two or more removable face shields 70 are typically sold separately from the hood 20 with fixed face shield 80. For example, a set of from about 5 to about 50 (or any number therebetween or greater than 50) removable face shields 70 may be sterilized, packaged, and sold separately from a corresponding sterile hood 20 with fixed face shield 80.

126. The hood 20 of any one of embodiments 112 to 125, wherein the transparent face shield material 72 comprises a polycarbonate sheet (e.g., a LEXAN® sheet), a polyethylene terephthalate (PET) sheet, or any other transparent polymer sheet. Typically, the transparent face shield material 72 has a sheet thickness of less than about 30 mils (i.e., 0.030 inch), more typically, from about 3 to about 20 mils, and even more typically, from about 5 to about 10 mils.

127. The hood 20 of any one of embodiments 112 to 126, wherein each of (i) the two or more hood connecting members 97, and (ii) the two or more face shield guard connecting components 177 comprises a VELCRO® hook or loop component.

128. The hood 20 of any one of embodiments 112 to 127, further comprising: an air inlet hole 81 disposed centrally above the face shield opening 95 and along and through hood material 87. See, for example, FIG. 21.

129. The hood 20 of embodiment 128, further comprising: an air filter (not shown) positioned next to and covering the air inlet hole 81.

130. The hood 20 of any one of embodiments 101 to 111 and 128 to 129, further comprising: a truncated cone structure 120 surrounding the air inlet hole 81, said truncated cone structure 120 sized to at least partially extend within an air inlet 42 of a collapsible air channel 33 (e.g., within the air channel aperture 42 positioned along the collapsible air channel 33 and within the upper layer of channel-forming material 34 as shown in FIG. 15) when present. See, for exemplary truncated cone structure 120 shown in FIG. 26, which further shows alternative implementations of a collapsible air channel 33' and air channel aperture 42), having structural and/or functional similarities to the collapsible air channel 33 and air channel aperture 42 described with respect to FIG. 15.

131. The hood 20 of embodiment 130, wherein the truncated cone structure 120 comprises a truncated cone structure base 121 with a base aperture 123 extending therethrough, and a truncated cone extension structure 122 extending outward from said truncated cone structure base 121 from at least one or more positions along an outer periphery of said base aperture 123.

Figure 26:
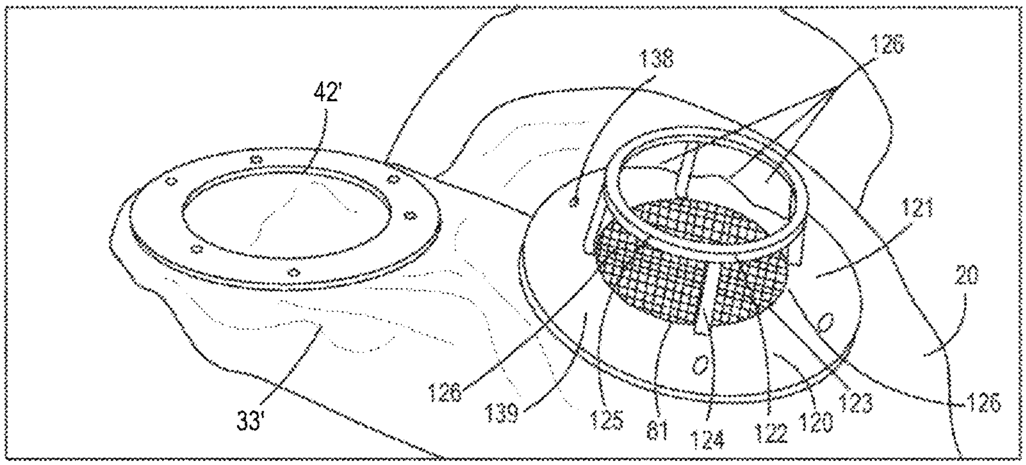
FIG. 26 depicts a view of an exemplary truncated cone attachment of some of the exemplary hoods of the present invention.
Figure 27:
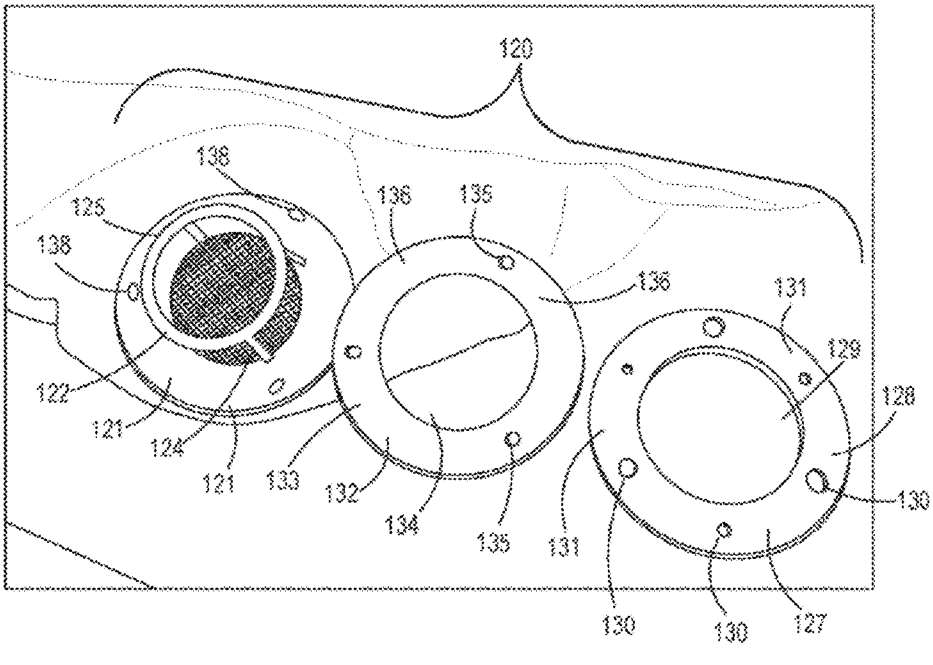
FIG. 27 depicts various exemplary components for securing exemplary truncated cone attachment shown in FIG. 26 to some of the exemplary hoods of the present invention.

As shown in FIGS. 26-27, truncated cone structure base 121 may further comprise two or more base connecting holes 138 extending thru said truncated cone structure base 121 along a periphery 139 of said truncated cone structure base 121. See, for example, exemplary truncated cone structure base 121 with three base connecting holes 138 extending therethrough in FIG. 27.

132. The hood 20 of embodiment 131, wherein said truncated cone extension structure 122 comprises (i) one or more vertically-extending cone members 124, and (ii) one or more horizontally-extending cone members 125 with one or more cone apertures 126 therebetween.

133. The hood 20 of embodiment 131 or 132, wherein said truncated cone extension structure 122 comprises (i) three or four vertically-extending cone members 124, and (ii) one horizontally-extending cone member 125 with four or five cone apertures 126 therebetween.

134. The hood 20 of any one of embodiments 131 to 133, wherein said truncated cone extension structure 122 is integrally connected to said truncated cone structure base 121 at one or more positions along an outer periphery of said base aperture 123. See, for example, FIGS. 26-27.

135. The hood 20 of any one of embodiments 131 to 134, wherein said truncated cone structure 120 further comprises a first truncated cone structure flange 127, said first truncated cone structure flange 127 comprising a first flange base 128 with a first flange aperture 129 extending centrally therethrough, and two or more first flange connecting holes 130 extending thru said first flange base 128 along a periphery of said first flange base 128. See, for example, FIG. 27. First truncated cone structure flange 127 is designed to attach to (i) truncated cone structure base 121, and (ii) hood material 87 either directly (i.e., in direct contact with either or both) or indirectly (i.e., bonded to either or both indirectly via another component).

136. The hood 20 of any one of embodiments 131 to 135, wherein said truncated cone structure 120 further comprises a second truncated cone structure flange 132, said second truncated cone structure flange 132 comprising a second flange base 133 with a second flange aperture 134 extending centrally therethrough, and two or more second flange connecting prongs 135 extending outward from said second flange base 133 along a periphery 136 of said second flange base 133.

See, for example, FIG. 27. Second truncated cone structure flange 132 is designed to attach to (i) truncated cone structure base 121, (ii) first truncated cone structure flange 127, when present, and (iii) hood material 87 either directly (i.e., in direct contact with one or more) or indirectly (i.e., bonded to one or more indirectly via another component). It should be noted that in some embodiments, one or more of the components of truncated cone structure 120, such as one or more of: (i) truncated cone structure base 121, (ii) truncated cone extension structure 122, (iii) first truncated cone structure flange 127, and/or (iv) second truncated cone structure flange 132, may be magnetically attracted to and attachable with a corresponding component along collapsible air channel 33' (e.g., the upper layer of channel-forming material 34 as shown in FIG. 15) or some other helmet component that enables attachment of the hood 20 with truncated cone structure 120 to a helmet (i.e., a helmet with or without a collapsible air channel 33'). In some embodiments, the truncated cone structure base 121 is magnetically attracted to and connectable with a helmet component, such as a collapsible air channel 33'.

137. The hood 20 of any one of embodiments 112 to 136, further comprising: one or more air outlet holes 82 disposed along and through the hood material 87. See, for example, FIG. 18.

138. The hood 20 of any one of embodiments 112 to 137, further comprising: one or more air outlet holes 82 disposed along and through a rear portion of the hood material 87. See again, FIG. 18, wherein air outlet hole 82 is disposed along and through a rear portion of the hood material 87 so as to be positioned along a lower, rear portion of a user's head and above the user's neck line.

139. The hood 20 of any one of embodiments 112 to 138, further comprising: a tie-string 91 positioned proximate the lower edge 88 and extending along at least a portion of the lower periphery 89 of the hood material 87, the tie-string 91 enabling a user to reduce a circumference of the hood opening 90 from an initial circumference to an in-use circumference. See again, FIGS. 17-20, and 22-24. Also, see, the initial circumference in FIG. 17 and the in-use circumference in

FIG. 20.

140. The hood 20 of embodiment 139, wherein the tie-string 91 is positioned from about 4.0 inch to about 10.0 inches above the lower edge 88.

141. The hood 20 of embodiment 139 or 140, wherein the tie-string 91 extends along substantially all of the lower periphery 89 of the hood material 87.

142. The hood 20 of any one of embodiments 139 to 141, further comprising: a tie-string channel 92 that extends along at least a portion of the lower periphery 89 of the hood material 87, the tie-string channel 92 comprising a tie-string channel inlet 93 and a tie-string channel outlet 94. See, for example, FIGS. 17, 19 and 20, which shows tie-string 91 entering tie-string channel inlet 93 and exiting tie-string channel outlet 94.

143. The hood 20 of embodiment 142, wherein the tie-string channel 92 extends along substantially all of the lower periphery 89 of the hood material 87.

144. The hood 20 of embodiment 142 or 143, wherein the tie-string channel 92 comprises (i) hood material 87 and (ii) an overlapping piece of channel material (not shown) positioned over and along an inner surface (not shown) or an outer surface 83 of the hood material 87. As discussed above, in FIGS. 17-20, exemplary tie-string channel 92 comprises (i) hood material 87 positioned about 3.0 inches above lower edge 88 and extending along substantially all of lower periphery 89, and (ii) an overlapping piece of channel material (not shown) positioned over and along an inner surface (not shown) of the hood material 87.

145. The hood 20 of any one of embodiments 139 to 144, further comprising a tie-string locking device 96 that is movable along the tie-string 91 so as to move from (i) a first locked position corresponding to the hood opening 90 having the initial circumference in a non-use position to (ii) a second locked position corresponding to the hood opening 90 having the in-use circumference. See again, FIGS. 17 and 20.

146. The hood 20 of any one of embodiments 139 to 145, wherein the tie-string 91 has a length of from about 20 inches to about 36 inches.

147. The hood 20 of any one of embodiments 99 to 146, wherein the hood material 87 comprises a nonwoven material. It should be understood that hood material 87 may comprise any material typically used to form a given hood 20. For example, hood material 87 may comprise a nonwoven material such as a spunlaced material, a spunbonded material, a meltblown material, other types of nonwoven materials, woven materials, film materials, or any combination thereof.

148. The hood 20 of any one of embodiments 99 to 147, wherein the hood material 87 comprises a spunlaced polypropylene nonwoven fabric.

149. The hood 20 of any one of embodiments 99 to 148, wherein the hood material 87 has a fabric basis weight of about 30 to about 50 grams per square meter (gsm).

150. The hood 20 of any one of embodiments 99 to 149, wherein the hood material 87 has a fabric basis weight of about 40 gsm.

151. The hood 20 of any one of embodiments 99 to 150, further comprising: one or more connectors (not shown) sized and designed to connect the hood 20 to a helmet.

152. The hood 20 of any one of embodiments 99 to 151, further comprising: one or more connectors sized and designed to connect the hood 20 to the helmet 100 of any one of embodiments 1 to 98.

153. The hood 20 of embodiment 151 or 152, wherein each of the one or more connectors independently comprises a hook or loop material (e.g., VELCRO® hook or loop material), a mechanical fastener such as a male/female connector, a hood male or female connector that engages with a corresponding helmet female/male connector, or any combination thereof. Typically, when present, each of the one or more connectors are positioned (i) proximate the face shield 80 or fixed face shield 80 of the hood 20, (ii) proximate the anterior shield strap 12 of helmet 100, or (iii) both (i) and (ii). In some embodiments, the one or more connectors comprise 2 to 7 (typically, about 3 to 5 connectors) positioned and spaced from one another along an upper area of a helmet (e.g., spaced from one another along the anterior shield strap 12 of helmet 100). In some embodiments, the one or more connectors comprise 2 to 7 connectors (typically, about 3 to 5 connectors) positioned and spaced from one another along anterior shield strap 12 of helmet 100 such that each of the 2 to 7 connectors are positioned on opposite sides of the along anterior shield strap 12 (i.e., none of the connectors are centrally located, e.g., directly in front of a user's nose).

154. A single-use, disposable hood 20 comprising: hood material 87 sized to extend over a user's head and down to a neck/shoulder region of the user, the hood material 87 comprising: (i) a face shield opening 95 extending through the hood material 87 and along a front side of the hood 20, (ii) a lower edge 88 extending along a lower periphery 89 of the hood material 87 and around a hood opening 90 of the hood 20, (iii) an air inlet hole 81 disposed centrally above the face shield opening 95 and along and through hood material 87, and (iv) a truncated cone structure 120 surrounding the air inlet hole 81, said truncated cone structure 120 sized to at least partially extend within an air inlet 42 of a collapsible air channel 33 (e.g., within the air channel aperture 42 positioned along the collapsible air channel 33 and within the upper layer of channel-forming material 34 as shown in FIG. 15) when present. See, for exemplary truncated cone structure 120 shown in FIG. 26.

155. The hood 20 of embodiment 154, wherein the hood 20 further comprises any features or combination of features as recited in any one of embodiments 99 to 127, 129 and 131 to 153.

156. The hood 20 of any one of embodiments 99 to 155, in combination with the helmet of any one of embodiments 1 to 98.

157. A package 85 comprising (i) the helmet 100 of any one of embodiments 1 to 98, alone or in combination with the hood 20 of any one of embodiments 99 to 155, in a shipping configuration (see, for example, FIG. 1), and (ii) packaging material 86 surrounding the helmet 100, alone or in combination with the hood 20, wherein the package 85 has a package volume with a package length of up to about 16.0 inches, a package width of up to about 20.0 inches, and a package height of up to about 3.5 inches.

158. The package 85 of embodiment 157, wherein the package 85 has a package length of up to 14.0 inches, a package width of up to about 18.5 inches, and a package height of up to about 2.5 inches.

159. The package 85 of embodiment 157 or 158, wherein the package 85 has a package length of up to 12.0 inches, a package width of up to about 17.0 inches, and a package height of up to about 1.5 inches.

Methods of Making Helmets and Helmet/Face Shield/Hood Combinations

160. A method of making the helmet 100 of any one of embodiments 1 to 98, said method comprising the steps of: combining the forehead strap 11, the anterior shield strap 12, and the fan platform 13 to form a helmet structure 100'; and positioning the fan 14 within the fan platform 13.

161. The method of embodiment 160, further comprising: forming one or more of the following components: the forehead strap 11, the anterior shield strap 12, the fan platform 13, the first gear strap 61, the second gear strap 64, the overhead strap 45, the gear box housing 67, the gear 68, the knob 69, the battery housing 30, the anterior strap 23, the fan guard 18, the one or more connectors 70, the one or more sweat bands 72, and the collapsible air channel 33.

162. The method of embodiment 160 or 161, further comprising: connecting one or more of the following components to one another to form the helmet structure: the forehead strap 11, the anterior shield strap 12, the fan platform 13, the first gear strap 61, the second gear strap 64, the overhead strap 45, the gear box housing 67, the gear 68, the knob 69, the battery housing 30, the anterior strap 23, the fan guard 18, the one or more connectors 70, the one or more sweat bands 72, the collapsible air channel 33, and the one or more UVC lights 43.

163. The method of any one of embodiments 160 to 162, said method comprising: connecting the following components to one another to form the helmet structure 100': the forehead strap 11, the anterior shield strap 12, the fan platform 13, the first gear strap 61, the second gear strap 64, the overhead strap 45, the anterior strap 23, and the fan guard 18.

164. The method of any one of embodiments 160 to 163, said method comprising: connecting the following components to one another to form the helmet structure 100': the forehead strap 11, the anterior shield strap 12, the fan platform 13, the first gear strap 61, the second gear strap 64, the overhead strap 45, the anterior strap 23, the fan guard 18, and the battery housing 30.

165. The method of any one of embodiments 160 to 164, said method comprising: (i) connecting the proximal end 24 of the anterior strap 23 to the main frame 10, and (ii) connecting the distal end 25 of the anterior strap 23 to the overhead strap 45.

166. The method of any one of embodiments 160 to 165, said method comprising: connecting the fan guard 18 to (i) the anterior strap connector 26 of the anterior strap 23 and an anterior position 19 along the fan platform 23.

167. The method of any one of embodiments 160 to 162, said method comprising: connecting the following components to one another to form the helmet structure 100': the forehead strap 11, the anterior shield strap 12, the fan platform 13, the first gear strap 61, the second gear strap 64, the overhead strap 45, and the collapsible air channel 33.

168. The method of any one of embodiments 160 to 162 and 167, said method comprising: connecting the collapsible air channel 33 to (i) an anterior position 19 along the fan platform 23, and (ii) the overhead strap connector 50 of the overhead strap 45.

169. The method of any one of embodiments 160 to 162 and 167 to 168, further comprising: forming the collapsible air channel 33 comprising the upper layer of channel-forming material 34, the lower layer of channel-forming material 35, and the one or more posts 36 positioned so as to separate the upper layer of channel-forming material 34 from the lower layer of channel-forming material 35. The method may further comprise: forming the air channel aperture 42 along the collapsible air channel 33, for example, within the upper layer of channel-forming material 34, as shown in FIG. 15.

170. The method of any one of embodiments 160 to 169, further comprising: connecting one or more of the following components to the helmet structure 100': the gear box housing 67, the gear 68, the knob 69, the one or more connectors 70, and the one or more sweat bands 72.

171. The method of any one of embodiments 160 to 170, wherein the gear box housing 67, the gear 68, and the knob 69 are each positioned along a rear end 98 of the helmet structure 100'.

172. A method of making the hood 20 of any one of embodiments 99 to 111, said method comprising the steps of: forming the hood material 87 sized to extend over a user's head and down to a neck/shoulder region of the user, the hood material 87 comprising: (i) a face shield opening 95 extending through the hood material 87 and along a front side of the hood 20, and (ii) a lower edge 88 extending along a lower periphery 89 of the hood material 87 and around a hood opening 90 of the hood 20; and positioning a tie-string 91 proximate the lower edge 88 so as to extend along at least a portion of the lower periphery 89 of the hood material 87, the tie-string 91 enabling a user to reduce a circumference of the hood opening 90 from an initial circumference to an in-use circumference. See, for example, the initial circumference in FIG. 17 and the in-use circumference in FIG. 20.

173. The method of embodiment 172, further comprising: positioning a face shield 80 within face shield opening 95; and attaching the face shield 80 to the hood material 87 surrounding the face shield opening 95.

174. The method of embodiment 172 or 173, further comprising: forming an air inlet hole 81 disposed centrally above the helmet 100 and along and through the hood material 87. See, for example, FIG. 21.

175. The method of any one of embodiments 172 to 174, further comprising: positioning an air filter (not shown) next to and covering the air inlet hole 81.

176. The method of any one of embodiments 172 to 175, further comprising: forming one or more air outlet holes 82 disposed along and through the hood material 87. See, for example, FIG. 18.

177. The method of any one of embodiments 172 to 176, further comprising: forming a tie-string channel 92 that extends along at least a portion of the lower periphery 89 of the hood material 87, the tie-string channel 92 comprising a tie-string channel inlet 93 and a tie-string channel outlet 94. See, for example, FIG. 19, which shows tie-string 91 entering tie-string channel inlet 93 and exiting tie-string channel outlet 94.

178. The method of embodiment 177, wherein the tie-string channel 92 extends along substantially all of the lower periphery 89 of the hood material 87.

179. The method of embodiment 177 or 178, wherein the tie-string channel 92 comprises (i) hood material 87 and (ii) an overlapping piece of channel material (not shown) positioned over and along an inner surface (not shown) or an outer surface 83 of the hood material 87. As discussed above, in FIGS. 17-20, exemplary tie-string channel 92 comprises (i) hood material 87 positioned about 3.0 in above lower edge 88 and extending along substantially all of lower periphery 89, and (ii) an overlapping piece of channel material (not shown) positioned over and along an inner surface (not shown) of the hood material 87.

180. The method of any one of embodiments 172 to 179, further comprising positioning a tie-string locking device 96 along the tie-string 91 so as to be movable from (i) a first locked position corresponding to the hood opening 90 having the initial circumference in a non-use position to (ii) a second locked position corresponding to the hood opening 90 having the in-use circumference.

181. The method of any one of embodiments 160 to 180, further comprising: collapsing the helmet structure 100', alone or in combination with the hood 20, into a shipping and/or storing configuration so as to occupy a volume having a length of up to about 16.0 inches, a width of up to about 20.0 inches, and a height of up to about 3.5 inches.

182. The method of any one of embodiments 160 to 181, further comprising: collapsing the helmet structure 100', alone or in combination with the hood 20, into a shipping and/or storing configuration so as to occupy a volume having a length of up to 14.0 inches, a width of up to about 18.5 inches, and a height of up to about 2.5 in inches when fully assembled.

183. The method of any one of embodiments 160 to 182, further comprising: collapsing the helmet structure 100', alone or in combination with the hood 20, into a shipping and/or storing configuration so as to occupy a volume having a length of up to 12.0 inches, a width of up to about 17.0 inches, and a height of up to about 1.5 inches when fully assembled.

Methods of Making Hoods and Face Shield/Hood Combinations

184. A method of making the hood 20 of any one of embodiments 112 to 155, said method comprising the steps of: attaching the fixed face shield 80 to the hood material 87 so as to permanently cover the face shield opening 95; and incorporating two or more hood connecting members 97 into or onto the hood 20 so as to be positioned along the outer periphery 98 of the face shield opening 95.

185. The method of embodiment 184, further comprising: forming the at least one removable stick-on face shield guard 70.

186. The method of embodiment 184 or 185, wherein said attaching step comprises adhesively attaching the fixed face shield 80 to the hood material 87 so that the fixed face shield 80 is permanently attached to the hood material 87.

187. The method of any one of embodiments 184 to 186, wherein said incorporating step comprises incorporating four hood connecting members 97 into or onto the hood 20, the four hood connecting members 97 being positioned at four corners of the face shield opening 95 (i.e., an upper left-hand corner, an upper right-hand corner, a lower left-hand corner, and a lower right-hand corner).

188. The method of any one of embodiments 185 to 187, wherein said forming step comprises attaching the two or more face shield guard connecting components 177 to the transparent face shield material 72.

189. The method of any one of embodiments 185 to 188, wherein said forming step comprises attaching four face shield guard connecting components 177 to the transparent face shield material 72.

190. The method of embodiment 189, wherein the four face shield guard connecting-components 177 are positioned at four corners of a given removable stick-on face shield guard 70 (i.e., an upper left-hand corner, an upper right-hand corner, a lower left-hand corner, and a lower right-hand corner), and attached thereto.

191. The method of any one of embodiments 185 to 190, wherein said forming step further comprises attaching a strip of material 74 so as to extend horizontally along opposite edges 75/76 of a given removable stick-on face shield guard 70.

192. The method of any one of embodiments 184 to 191, further comprising: forming the hood material 87 sized to extend over a user's head and down to a neck/shoulder region of the user, the hood material 87 comprising: (i) the face shield opening 95 extending through the hood material 87 and along a front side of the hood 20, and (ii) a lower edge 88 extending along a lower periphery 89 of the hood material 87 and around a hood opening 90 of the hood 20.

193. The method of any one of embodiments 184 to 192, further comprising: forming an air inlet hole 81 disposed centrally above the fixed face shield 80 and along and through the hood material 87. See, for example, FIG. 21.

194. The method of embodiment 193, further comprising: positioning an air filter (not shown) next to and covering the air inlet hole 81.

195. The method of any one of embodiments 184 to 194, further comprising: forming one or more air outlet holes 82 disposed along and through the hood material 87. See, for example, FIG. 18.

196. The method of any one of embodiments 184 to 195, further comprising: positioning a tie-string 91 proximate the lower edge 88 so as to extend along at least a portion of the lower periphery 89 of the hood material 87, the tie-string 91 enabling a user to reduce a circumference of the hood opening 90 from an initial circumference to an in-use circumference. See again, for example, the initial circumference in FIG. 17 and the in-use circumference in FIG. 20.

197. The method of any one of embodiments 184 to 196, further comprising: forming a tie-string channel 92 that extends along at least a portion of the lower periphery 89 of the hood material 87, the tie-string channel 92 comprising a tie-string channel inlet 93 and a tie-string channel outlet 94. See, for example, FIG. 19, which shows tie-string 91 entering tie-string channel inlet 93 and exiting tie-string channel outlet 94.

198. The method of embodiment 197, wherein the tie-string channel 92 extends along substantially all of the lower periphery 89 of the hood material 87.

199. The method of embodiment 197 or 198, wherein the tie-string channel 92 comprises (i) hood material 87 and (ii) an overlapping piece of channel material (not shown) positioned over and along an inner surface (not shown) or an outer surface 83 of the hood material 87. As discussed above, in FIGS. 17-20, exemplary tie-string channel 92 comprises (i) hood material 87 positioned about 3.0 in above lower edge 88 and extending along substantially all of lower periphery 89, and (ii) an overlapping piece of channel material (not shown) positioned over and along an inner surface (not shown) of the hood material 87.

200. The method of any one of embodiments 196 to 199, further comprising positioning a tie-string locking device 96 along the tie-string 91 so as to be movable from (i) a first locked position corresponding to the hood opening 90 having the initial circumference in a non-use position to (ii) a second locked position corresponding to the hood opening 90 having the in-use circumference.

201. The method of any one of embodiments 99 to 200, further comprising: attaching a truncated cone structure 120 so as to surround an air inlet hole 81 of the hood 20, the truncated cone structure 120 sized to at least partially extend within an air inlet 42 of a collapsible air channel 33 (e.g., within the air channel aperture 42 positioned along the collapsible air channel 33 and within the upper layer of channel-forming material 34 as shown in FIG. 15) when present. See, for exemplary truncated cone structure 120 shown in FIG. 26.

202. The method of embodiment 201, wherein the truncated cone structure 120 has a structure as described in of any one of embodiments 131 to 135.

203. The method of any one of embodiments 99 to 202, further comprising: attaching one or more connectors along the hood 20 proximate the face shield opening 95, each of the one or more connectors enabling connection of the hood 20 to the helmet 100.

204. The method of embodiment 203, wherein each of the one or more connectors independently comprises a hook or loop material (e.g., VELCRO® hook or loop material), a mechanical fastener such as a male/female connector, a hood male or female connector that engages with a corresponding helmet female/male connector, or any combination thereof.

It should be understood that any of the above-described helmet 100 components and hood 20 components may be sterilized, prior to use, and typically prior to packaging, using conventional sterilization techniques (e.g., ethylene oxide sterilization, etc.).

Methods of Using Helmets and Helmet/Face Shield/Hood Combinations

205. A method of using the helmet 100 of any one of embodiments 1 to 98, said method comprising the steps of: positioning the helmet 100 on a user's head. See, for example, FIGS. 17-24.

206. The method of embodiment 205, further comprising: removing the helmet 100 from packaging material 86 surrounding the helmet 100.

207. The method of embodiment 205 or 206, further comprising: rotating the overhead strap 45 from within a first plane containing the forehead strap 11 and the anterior shield strap 12 (i.e., within a horizontal position as shown in FIG. 13) into (ii) a second plane substantially normal to the first plane (i.e., within a vertical position as shown in FIGS. 14-16).

208. The method of any one of embodiments 205 to 207, further comprising: connecting the anterior strap 23 or the collapsible air channel 33 to the overhead strap connector 50 of the overhead strap 45.

209. The method of any one of embodiments 205 to 208, further comprising: expanding helmet 100 from a collapsible state (i.e., shipping and/or storage state) into a "use" or operational state so as to expand the helmet 100 into an in-use helmet 100 having a length of about 11.0 inches, a width of about 11.0 inches, and a height of about 10.0 inches.

210. The method of any one of embodiments 205 to 209, further comprising: connecting the face shield 80 or the hood 20 to the anterior shield strap 12 of the main frame 10.

211. The method of any one of embodiments 205 to 210, further comprising: connecting the hood 20 of any one of embodiments 95 to 107 to the anterior shield strap 12 of the main frame 10.

212. The method of embodiment 211, further comprising: using the tie-string 91 to reduce a circumference of the hood opening 90 from an initial circumference to an in-use circumference. See, for example, the initial circumference in FIG. 17 and the in-use circumference in FIG. 20.

213. The method of embodiment 211 or 212, further comprising: positioning an outer garment 99 (e.g., a lab coat, a surgical gown, coveralls, any other piece of protective clothing, etc.) over the lower edge 88 of the hood material 87 so as to cover at least a portion of the lower edge 88 of the hood material 87. See, for example, FIG. 20.

214. The method of any one of embodiments 205 to 213, further comprising: exposing the helmet 100 to one or more of the following environments: a medical setting, an operating room, a trauma center, a chemical spill setting, a laboratory, a sterile environment, a work setting, disaster areas (e.g., earthquake area, flood area, war zone, ebola-breakout area, etc.), or any other location that is suspected of having some degree of contamination. The here-in described helmet 100 provides a "safe space" around a user's head, separating the user's mouth, nose, and eyes from a contaminated environment or affected individual or animal. Because the here-in described helmet 100 uses one or more batteries (e.g., AA or AAA batteries), the here-in described helmet 100 can be used in remote locations (e.g., disaster areas) that do not provide electrical outlets.

Methods of Using Hoods and Face Shield/Hood Combinations

215. A method of using the hood 20 of any one of embodiments 99 to 155, said method comprising the steps of: positioning the hood 20 on a user's head.

216. The method of embodiment 215, further comprising: attaching the at least one removable stick-on face shield guard 70 to the hood 20 so as to extend over the face shield opening 95.

217. The method of embodiment 215 or 216, further comprising: removing the at least one removable stick-on face shield guard 70 from the hood 20 so as to expose the fixed face shield 80.

218. The method of any one of embodiments 215 to 217, further comprising: removing the at least one removable stick-on face shield guard 70 from the hood 20 so as to expose the fixed face shield 80 after the at least one removable stick-on face shield guard 70 is contaminated with one or more contaminants (e.g., blood); and attaching a clean, unused removable stick-on face shield guard 70 to replace the contaminated removable stick-on face shield guard 70.

Figure 5:
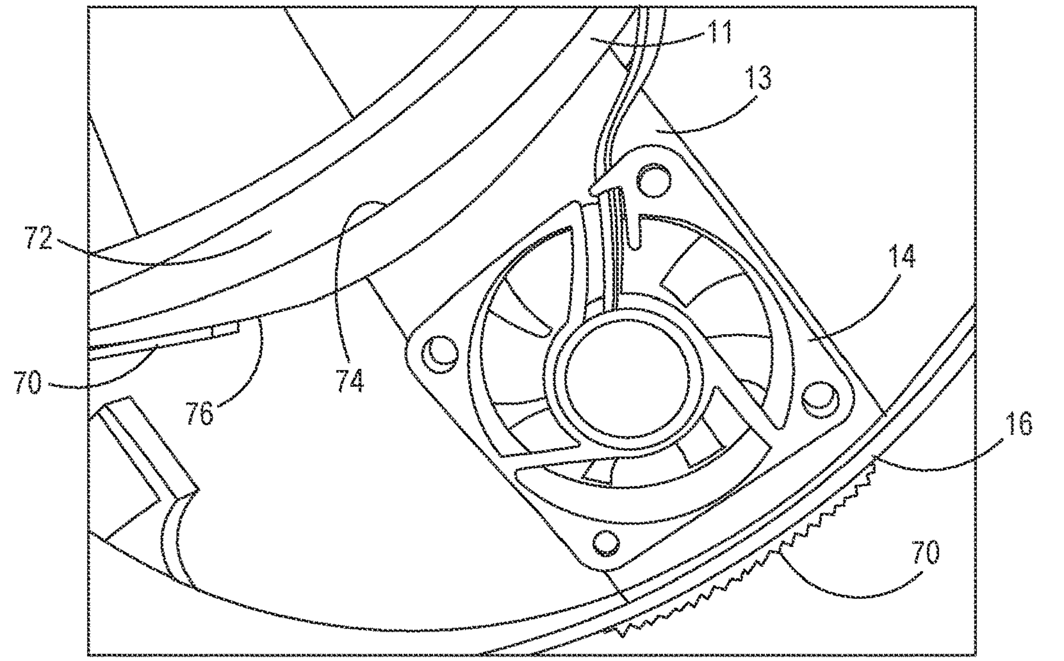
FIG. 5 depicts a close-up view of an exemplary fan positioned along the exemplary fan platform shown in FIG. 4A.
Figure 6:
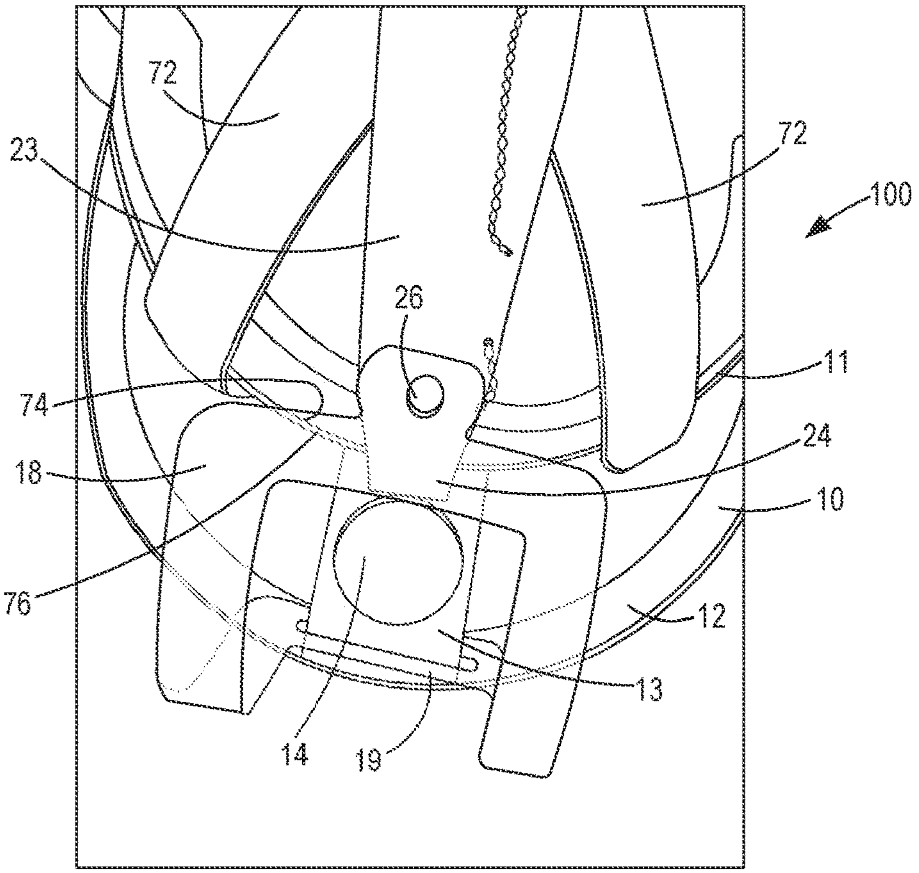
FIG. 6 depicts a close-up top view of the exemplary fan guard, and the exemplary fan positioned within the exemplary fan platform.
Figure 7:
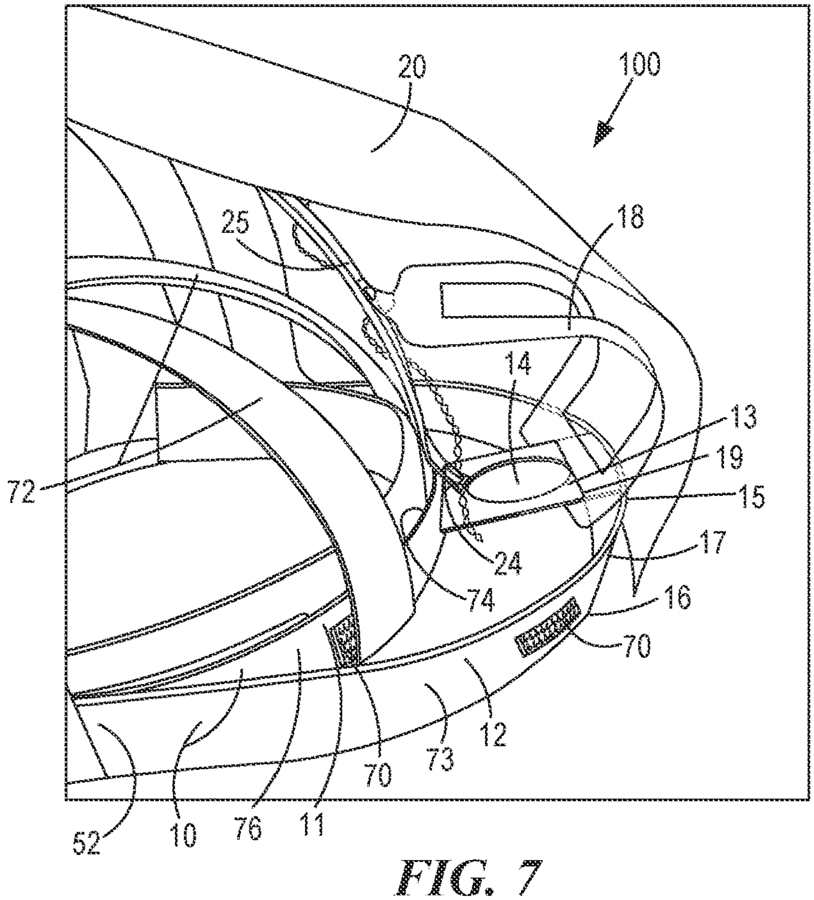
FIG. 7 depicts a side view of the exemplary helmet shown in FIG. 2B with the exemplary fan guard preventing hood material from coming into contact with the exemplary fan.

219. The method of any one of embodiments 215 to 218, further comprising: using the tie-string 91 to reduce a circumference of the hood opening 90 from an initial circumference to an in-use circumference. See again, for example, the initial circumference in FIG. 5 and the in-use circumference in FIG. 8.

220. The method of any one of embodiments 215 to 219, further comprising: positioning an outer garment 99 (e.g., a lab coat, a surgical gown, coveralls, any other piece of protective clothing, etc.) over the lower edge 88 of the hood material 87 so as to cover at least a portion of the lower edge 88 of the hood material 87. See, for example, FIG. 8.

221. The method of any one of embodiments 215 to 220, further comprising: exposing the hood 20 to one or more of the following environments: a medical setting, an operating room, a trauma center, a chemical spill setting, a laboratory, a sterile environment, a work setting, disaster areas (e.g., earthquake area, flood area, war zone, Ebola-breakout area, etc.), or any other location that is suspected of having some degree of contamination. The here-in described hood 20 provides a "safe space" around a user's head, separating the user's mouth, nose, and eyes from a contaminated environment or affected individual or animal.

In addition, it should be understood that although the above-described helmets and methods are described as "comprising" one or more components or steps, the above-described helmets and methods may "comprise," "consists of" or "consist essentially of" the above-described components or steps of the helmets and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a helmet and/or method that "comprises" a list of elements (e.g., components or steps) is not necessarily limited to only those elements (or components or steps), but may include other elements (or components or steps) not expressly listed or inherent to the helmet and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a helmet and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described helmets and/or methods may comprise, consist essentially of, or consist of any of the herein-described components and features, as shown in the figures with or without any feature(s) not shown in the figures. In other words, in some embodiments, the helmets of the present invention do not have any additional features other than those shown in the figures, and such additional features, not shown in the figures, are specifically excluded from the helmets. In other embodiments, the helmets of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Helmets, hoods, and helmets/hood assemblies similar to those shown in FIGS. 1-27 were prepared and utilized in non-sterile and sterile environments.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A single-use, disposable hood comprising:

a single-use, disposable helmet;

a hood material that is attachable to the single-use, disposable helmet and configured to be sized to extend over a user's head and down to a neck/shoulder region of the user, said hood material comprising:

(i) a face shield opening extending through the hood material and along a front side of the hood, (ii) a lower edge extending along a lower periphery of the hood material and around a hood opening of the hood, (iii) an air inlet hole extending through the hood material;

a tie-string positioned proximate the lower edge and extending along at least a portion of the lower periphery of the hood material, the tie-string enabling the user to reduce a circumference of the hood opening from an initial circumference to an in-use circumference; and a truncated cone air inlet structure surrounding the air inlet hole, the truncated cone air inlet structure comprising a base having a base aperture extending therethrough, the truncated cone air inlet structure further comprising an extension structure extending outward from the base, the extension structure having independent vertical extensions arranged substantially perpendicular to the base and a ring structure attached to opposite ends of the vertical extensions from the base, the base configured to be coupled to the hood material such that the base aperture is substantially aligned with the air inlet hole and the extension structure is directed toward the single-use, disposable helmet.

2. The hood of claim 1, further comprising:

a face shield positioned within the face shield opening and attached to the hood material surrounding the face shield opening.

3. The hood of claim 1, further comprising:

one or more air outlet holes disposed along and through a rear portion of the hood material configured to be positioned along a lower, rear portion of the user's head and above the user's neck line.

4. The hood of claim 1, wherein the tie-string is positioned about 4.0 inches to about 10.0 inches above the lower edge, and extends along substantially all of the lower periphery of the hood material.

5. The hood of claim 1, further comprising:

a tie-string channel that extends along at least a portion of the lower periphery of the hood material, the tie-string channel comprising a tie-string channel inlet and a tie-string channel outlet, and wherein the tie-string channel comprises (i) the hood material and (ii) an overlapping piece of channel material positioned over and along an inner surface or an outer surface of the hood material.

6. The hood of claim 1, further comprising:

a tie-string locking device that is movable along the tie-string so as to move from (i) a first locked position corresponding to the hood opening having the initial circumference in a non-use position to (ii) a second locked position corresponding to the hood opening having the in-use circumference, the in-use circumference being smaller in length than the initial circumference.

7. The hood of claim 1, further comprising:

a removable stick-on face shield guard, the removable stick-on face shield guard sized to extend over the face shield opening and be removably attachable to the hood, and the removable stick-on face shield guard comprises (i) a transparent face shield material, and (ii) two or more face shield guard connecting components, the two or more face shield guard connecting components being attachable to and/or connectable to and/or engageable with two or more corresponding hood connecting members on said hood material surrounding said face shield opening.

8. The hood of claim 7, wherein the removable stick-on face shield guard comprises a set of two or more separate and removable stick-on face shield guards, each separate and removable stick-on face shield guard being separately attachable to said two or more corresponding hood connecting members.

9. The hood of claim 8, wherein said set of two or more separate and removable stick-on face shield guards comprises from about 5 to about 50 separate, sterile, removable stick-on face shield guards.

10. The hood of claim 1, wherein the helmet further comprises an air channel and the extension structure of the truncated cone air inlet structure is configured to at least partially extend within the air channel.

11. A single-use, disposable hood comprising:

a single-use, disposable helmet;

a hood material that is attachable to the single-use, disposable helmet and configured to be sized to extend over a user's head and down to a neck/shoulder region of the user, the hood material comprising:

(i) a face shield opening extending through the hood material and along a front side of the hood, and (ii) a lower edge extending along a lower periphery of the hood material and around a hood opening of the hood;

a fixed face shield attached to the hood material and covering the face shield opening;

two or more hood connecting members positioned along an outer periphery of the face shield opening;

a removable stick-on face shield guard, the removable stick-on face shield guard sized to extend over the face shield opening and be removably attachable to the hood, and the removable stick-on face shield guard comprises (i) a transparent face shield material, and (ii) two or more face shield guard connecting components, the two or more face shield guard connecting components being attachable to and/or connectable to and/or engageable with two or more corresponding hood connecting members on said hood material or said fixed face shield; and a truncated cone air inlet structure surrounding the air inlet hole, the truncated cone air inlet structure comprising a base having a base aperture extending therethrough, the truncated cone air inlet structure further comprising an extension structure extending outward from the base, the extension structure having independent vertical extensions arranged substantially perpendicular to the base and a ring structure attached to opposite ends of the vertical extensions from the base, the base configured to be coupled to the hood material such that the base aperture is substantially aligned with the air inlet hole and the extension structure is directed toward the single-use, disposable helmet.

12. The hood of claim 11, wherein the removable stick-on face shield guard comprises a set of two or more separate and removable stick-on face shield guards, each separate and removable stick-on face shield guard being separately attachable to said two or more corresponding hood connecting members.

13. The hood of claim 12, wherein said set of two or more separate and removable stick-on face shield guards comprises from about 5 to about 50 separate, sterile, removable stick-on face shield guards.

14. The hood of claim 12, wherein each of the two or more removable stick-on face shield guards comprises a strip of material extending horizontally along opposite edges of a given removable stick-on face shield guard.

15. The hood of claim 11, wherein each of the two or more face shield guard connecting components comprises a hook or loop material, and each of the two or more corresponding hood connecting members comprises a loop or hook material.

16. The hood of claim 11, wherein the two or more face shield guard connecting components comprise four separate face shield guard connecting components, and said two or more corresponding hood connecting members comprise four hood connecting members independently positioned at four corners of the face shield opening.

17. The hood of claim 11, further comprising:

a tie-string positioned proximate the lower edge and extending along at least a portion of the lower periphery of the hood material, the tie-string enabling the user to reduce a circumference of the hood opening from an initial circumference to an in-use circumference.

18. A single-use, disposable hood comprising:

a single-use, disposable helmet;

a hood material that is attachable to the single-use, disposable helmet and configured to be sized to extend over a user's head and down to a neck/shoulder region of the user, the hood material comprising:

(i) a face shield opening extending through the hood material and along a front side of the hood, (ii) a lower edge extending along a lower periphery of the hood material and around a hood opening of the hood, and (iii) an air inlet hole disposed centrally above the face shield opening and through the hood material; and a truncated cone air inlet structure surrounding the air inlet hole, the truncated cone air inlet structure comprising a base having a base aperture extending therethrough, the truncated cone air inlet structure further comprising an extension structure extending outward from the base, the extension structure having independent vertical extensions arranged substantially perpendicular to the base and a ring structure attached to opposite ends of the vertical extensions from the base, the base configured to be coupled to the hood material such that the base aperture is substantially aligned with the air inlet hole and the extension structure is directed toward the single-use, disposable helmet.

19. The hood of claim 18, further comprising:

a removable stick-on face shield guard sized to extend over the face shield opening and be removably attachable to the hood, the removable stick-on face shield guard comprises (i) a transparent face shield material, and (ii) two or more face shield guard connecting components, the two or more face shield guard connecting components being attachable to and/or connectable to and/or engageable with two or more corresponding hood connecting members on said hood material surrounding said face shield opening.

* * * * *